US012414892B2

(12) United States Patent
Afifi

(10) Patent No.: US 12,414,892 B2
(45) Date of Patent: Sep. 16, 2025

(54) SURGICAL SUPPORT SYSTEMS, DEVICES, AND METHODS

(71) Applicant: Ahmed M. Afifi, Madison, WI (US)

(72) Inventor: Ahmed M. Afifi, Madison, WI (US)

( * ) Notice: Subject to any disclaimer, the term of this patent is extended or adjusted under 35 U.S.C. 154(b) by 0 days.

(21) Appl. No.: 18/589,121

(22) Filed: Feb. 27, 2024

(65) Prior Publication Data

US 2025/0268775 A1 Aug. 28, 2025

Related U.S. Application Data

(63) Continuation of application No. PCT/US2023/083891, filed on Dec. 13, 2023.

(60) Provisional application No. 63/387,195, filed on Dec. 13, 2022.

(51) Int. Cl.
*A61G 13/12* (2006.01)

(52) U.S. Cl.
CPC ..... *A61G 13/1285* (2013.01); *A61G 13/1265* (2013.01); *A61G 2200/327* (2013.01)

(58) Field of Classification Search
CPC ............ A61G 13/1285; A61G 13/1265; A61G 13/123; A61G 13/122; A61G 13/1225; A61G 2200/327
See application file for complete search history.

(56) References Cited

U.S. PATENT DOCUMENTS 1,499,013 A * 6/1924 Henry .................. A61G 13/105 5/613
5,287,577 A 2/1994 Bremer et al.
9,522,078 B2 12/2016 Pizzini
2004/0177449 A1 9/2004 Wong et al.
2004/0199072 A1* 10/2004 Sprouse ................ A61B 5/062 5/601
2007/0283496 A1 12/2007 Skripps
2008/0104762 A1* 5/2008 Davis .................. A61G 7/1021 5/621
2008/0134437 A1 6/2008 Small
2009/0044813 A1 2/2009 Gneiting et al.
2009/0271923 A1 11/2009 Lewis
2010/0327870 A1 12/2010 Shvartsberg et al.
2011/0094040 A1 4/2011 Degreef et al.
2011/0289691 A1 12/2011 Lafleche et al.
2013/0000041 A1* 1/2013 Receveur .............. A61G 7/015 5/613
2013/0081205 A1 4/2013 Frondorf et al.
2019/0029906 A1 1/2019 Konsin et al.
2019/0307626 A1 10/2019 Visco
(Continued)

OTHER PUBLICATIONS

Delgato Acarreta et al, EP 3578152 A1, Dec. 2019.*
(Continued)

*Primary Examiner* — Camtu T Nguyen
(74) *Attorney, Agent, or Firm* — Casimir Jones, S.C.; David A. Casimir

(57) ABSTRACT

Provided herein are systems, devices, and methods for supporting a patient undergoing a medical procedure that involves treatment of any or all sides of the body (e.g., posterior, anterior, and/or lateral sides of the patient's body or body parts). For example, the systems, devices, and methods facilitate surgical procedures without requiring placing a patient in a prone or lateral position and/or minimizing or avoiding transitioning a patient between supine, prone, and/or lateral positions.

15 Claims, 25 Drawing Sheets

(56) References Cited

U.S. PATENT DOCUMENTS

| | | | |
|---|---|---|---|
| 2020/0060428 | A1 | 2/2020 | Langer |
| 2020/0268163 | A1 | 8/2020 | Duvert et al. |
| 2020/0315886 | A1 | 10/2020 | Dudonis et al. |
| 2020/0337479 | A1 | 10/2020 | Zurek |
| 2021/0154069 | A1 | 5/2021 | Davis |
| 2021/0307520 | A1 | 10/2021 | Batey |
| 2021/0322201 | A1 | 10/2021 | Tate |
| 2022/0054338 | A1 | 2/2022 | Shifrin |
| 2022/0104979 | A1 | 4/2022 | Soreefan et al. |
| 2022/0160560 | A1 | 5/2022 | Melcher et al. |

OTHER PUBLICATIONS

International Search Report and Written Opinion for PCT/US23/83891. Mailed Apr. 3, 2024. 24 pages.
Alternating Pressure Systems. Product information. Retrieved from the internet May 15, 2024. 18 pages.
AMSCO 2080M Manual Surgical Table. Retrieved from the internet 2024-05-15. 1 page.
Cardinal Health DEVON Additional Foam Pad and Strap Attachments. Product information. Retrieved from the internet May 15, 2024. 10 pages.
Cardinal Health DEVON Positioners. Product information. Retrieved from the internet May 15, 2024. 8 pages.
Clinitron Air Fluidized Therapy Bed. Product information. Retrieved from the internet May 15, 2024. 2 pages.
Cloward Surgical Saddle. Product information. Retrieved from the internet May 15, 2024. 1 page.
Foster and Stryker Rotating Frames. Definition. Retrieved from the internet May 15, 2024. 2 pages.
Kwee et al., The prone position during surgery and its complications: a systematic review and evidence-based guidelines. Int Surg. Feb. 2015;100(2):292-303.
Oscillating Beds Roto Rest Delta.Product information. Retrieved from the internet May 15, 2024. 1 page.
Pink Reverse-t Kit. Product information. Retrieved from the internet May 15, 2024. 9 pages.
Side-Lying Position System. OakWorks Medical Products. Product information. Retrieved from the internet May 16, 2024. 1 page.
Skytron Air Fluidized Therapy Bed. Product information. Retrieved from the internet May 15, 2024. 2 pages.
Techartmed ET800. Product information. Retrieved from the internet May 15, 2024. 6 pages.
The M.A.T. Patient body positioning system. Product information. Retrieved from the internet May 15, 2024. 1 page.
The Montreal Mattress. Product information. Retrieved from the internet May 15, 2024. 3 pages.

* cited by examiner

SURGICAL SUPPORT SYSTEMS, DEVICES, AND METHODS

FIELD

Provided herein are systems, devices, and methods for supporting a patient undergoing a medical procedure that involves treatment of any or all sides of the body (e.g., posterior, anterior, and/or lateral sides of the patient's body or body parts). For example, the systems, devices, and methods facilitate surgical procedures without requiring placing a patient in a prone or lateral position and/or minimizing or avoiding transitioning a patient between supine, prone, and/or lateral positions.

BACKGROUND

Surgery in the prone position is often a necessity when access to posterior anatomic structures is required. However, many complications are known to be associated with this type of surgery, as physiologic changes occur with increased pressure to posterior structures. At least thirteen different complications have been identified with prone procedures (see, Kwee et al., Int Surg., 100(2): 292-303 (2015)), including increased abdominal pressure, increased bleeding, abdominal compartment syndrome, limb compartment syndrome, shoulder dislocation, nerve palsies, pressure sores, cardiovascular compromise, thrombosis and stroke, hepatic dysfunction, postoperative vision loss, oropharyngeal swelling, venous air embolism, and endotracheal tube dislodgement. Additional problems arise when a procedure requires transitioning a patient from a supine to a prone position. For the patient, potential adverse consequences include displacement of the endotracheal tube (ETT), associated changes in ETT cuff pressure, injury caused by improper transfer, and prolonged procedure time. The transition from a supine to prone position, or vice versa, presents risks, liability, and inconvenience for healthcare workers, especially when dealing with large or fragile patients. There is a need for enhanced systems and methods to address these and other positioning challenges that arise when treating posterior, anterior, and/or lateral sides of patient's body or body parts.

SUMMARY

Provided herein are systems, devices, and methods for supporting a patient undergoing a medical procedure that involves treatment of any or all sides of the body (e.g., posterior, anterior, and/or lateral sides of the patient's body or body parts). For example, the systems, devices, and methods facilitate surgical procedures without requiring placing a patient in a prone or lateral position and/or minimizing or avoiding transitioning a patient between supine, prone, and/or lateral positions.

For example, in some embodiments, provide herein is a patient support device comprising a first (e.g., proximal) region, a second (e.g., intermediate) region, and a third (e.g., distal) region, wherein collectively, the first, second, and third regions provide a surface that supports a patient body (e.g., in a supine position), wherein the first (e.g., proximal) region supports a first portion of the patient (e.g., an upper portion such as the patient upper torso, neck, shoulders, arms and head; a side portion such as the right side; etc.) and the third (e.g., distal) region supports a second portion of the patient (e.g., a lower portion such as the patient legs; a side portion such as the left side; etc.); wherein the second (e.g., intermediate) region is removable or is transitional from a first position in contact with the patient (a supporting position) to a second position not in contact with the patient (a non-supporting position) or where the first and/or third regions are transitional to elevate a portion of the patient above the second region. In some embodiments, the second (e.g., intermediate) region is positioned below the subject's torso (upper, middle, and lower back) and/or buttocks. In some embodiments, the second position is a lowered position, creating a gap between the subject and the second (e.g., intermediate) region. In some embodiments, the gap is of sufficient size to allow surgical access to the subject's torso and/or buttocks while the patient is supine and supported by the first (e.g., proximal) and third (e.g., distal) regions. In some embodiments, the second (e.g., intermediate) region is deflatable, wherein the second (e.g., intermediate) region is transitioned to the lowered position by deflating the second (e.g., intermediate) region. In some embodiments, one or more regions other than the second (e.g., intermediate) region are inflated, creating a gap between the subject and the second (e.g., intermediate) region. In some embodiments, one or more regions other than the second region is raised. In some embodiments, one or more regions is inflatable/deflatable. In some embodiments, the first, second, and third regions are positioned under a limb (e.g., arm, leg) to facilitate procedures that target multiple points around the circumference of the limb.

In some embodiments, the support comprises one or more sensors to assess and report on the position or status of the support regions (e.g., fluid (e.g., air) pressure where one or more of the support regions is inflatable or deflatable).

In some embodiments, the support or a system associated with the support comprises pumps that pump fluid (e.g., air) into or out of one or more of the support regions. In some embodiments, different regions of the support may be inflated/deflated together or separately. In some embodiments, inflation and/or deflation is initiated automatically (e.g., triggered by a sensor).

In some embodiments, the support comprises a heating or cooling component that allows the support, or one or more of the regions of the support, to be maintained at a desired temperature prior to, during, or following a procedure (e.g., during patient recovery). In some embodiments, the support comprises one or more temperature sensors to detect and report temperature.

In some embodiments, the first, second, and/or third regions are composed of a plurality of separate support units. In some embodiments, each of the first, second, or third regions are composed of a plurality of separate support units that may be divided horizontally, vertically, or both. In some embodiments, one or more support units are sized and shaped to accommodate a patient's limbs or subregions of a patient's limbs (e.g., arms, legs, feet, thighs). Such support units may have variable angles to abduct or adduct the patient limb(s) or subregions thereof. In some embodiments, each of the first, second, and third regions are composed of a plurality of separate support units that contour to the patient body to avoid unwanted pressure. In some embodiments, each of the first, second, and third regions are composed of a plurality of separate support units containing pressure sensors. In some embodiments, each of the first, second, and third regions are completely or partially disposable. In some embodiments, one or more or all of said first, second, and third regions are radiolucent or comprise a radiolucent sub-region. In some embodiments, the radiolucent material is configured for compatibility with medical imaging procedures. In some embodiments, the medical imaging procedures include X-rays, computed tomography (CT), magnetic resonance imaging (MRI), nuclear medicine, positron emission tomography (PET) and ultrasound. In some embodiments, the plurality of separate support units are interconnected (connected to each other). In some embodiments, the plurality of separate support units are interconnected by a flexible connector.

In some embodiments, the support further comprises a further second (e.g., intermediate) region that is interchangeable with the other second (e.g., intermediate) region, while the patient is supported on the support; wherein the further second region has a lower height than the other second region. The further second region may also differ in other characteristics compared to the other second region, including, but not limited to, shape, consistency, surface texture, and the like.

In some embodiments, one or more of the further and/or other second regions comprise a handle or strap to facilitate removal of the second (e.g., intermediate) regions.

In some embodiments, each of said first, second, and/or third regions are configured for compatibility with a surgical support device or system.

In some embodiments, the first region is transitional from a first position holding said patient's upper body level with the buttocks to a second position holding said patient's upper body elevated above the buttocks, the third region is transitional from a first position holding said patient's knees level with the buttocks to a second position holding said patient's knees elevated above the buttocks, and the second region is transitional from a position in contact with the patient's buttocks to a position not in contact with the patient's buttocks.

In some embodiments, the second region is contoured to support the patient's buttocks when the patient's buttocks are in contact with the second region.

In some embodiments, one or more of the support regions comprises ridges or straps to assist in maintaining a patient's body or body region in a desired location during a medical procedure and to prevent the patient from falling off of the support. In some embodiments, the support device is used to avoid position changes or to minimize the number of position changes (e.g., supine to prone, prone to supine, supine to lateral, supine to lateral, lateral to prone, prone to lateral, lateral to lateral, lateral to lateral to prone to supine, etc.). In some embodiments, the support device reduces the risk of joint dislocation and neuropraxia associated with movement between positions.

Also provided herein are patient positioning methods, comprising: a) placing a patient, in a position (e.g., supine position), on any of the supports described above or elsewhere herein, and b) removing or transitioning one or more of the support regions (e.g., removing or lowering the second region; raising the first and third regions; etc.) to generate a surgical space below the patient in the second region. The second region and patient placement may be selected so that any desired region of a patient may undergo a medical procedure. In some embodiments, the medical procedure is an invasive surgery. In some embodiments, the invasive surgery includes but is not limited to, breast surgery, upper back surgery, harvesting of the latissimus dorsi flap, an arm lift, arm liposuction, abdominal liposuction, upper back lift, orthopedic procedures, and urologic surgeries. In some embodiments, the urologic surgery is supine percutaneous nephrolithotomy. In some embodiments, following the medical procedure, the second region is returned to an original, pre-transitioned form (e.g., inflated) or to an intermediate form (e.g., to provide optimal space or pressure for healing). In some embodiments, following the medical procedure, one or more or all of the support regions are transitioned to a minimal profile (e.g., deflated) and/or removed. In some embodiments, the second (e.g., intermediate) region is positioned below the lower back of the patient. In some embodiments, the second (e.g., intermediate) region is positioned below the buttocks of the patient. In some embodiments, the second (e.g., intermediate) region is positioned below the thigh of the patient. In some embodiments, the second (e.g., intermediate) region is positioned below the upper back of the patient. Second (e.g., intermediate) regions may be comprised of different sub-components that move independently of each other. In some embodiments, the method further comprises the step of performing a medical procedure (e.g., liposuction) on a posterior of the patient using a space created by the removing of or transitioning of the second (e.g., intermediate) region. In some embodiments, the method further comprises the step of performing a medical procedure on the anterior and/or lateral side of the patient, before or after or during the procedure performed on the posterior of the patient.

In some embodiments, the second (e.g., intermediate) region is removable. In some embodiments, following the medical procedure, a further second (e.g., intermediate) region having a height lower than the other second (e.g., intermediate) region is added to the support. In some embodiments, the height of the further second (e.g., intermediate) region provides support to swelled, healing tissue of the patient without putting undue pressure on the patient.

In some embodiments, the second (e.g., intermediate) region is deflatable and the removing or transitioning comprises deflating the second (e.g., intermediate) region. In some embodiments, following the medical procedure, the second (e.g., intermediate) region is fully or partially inflated. In some embodiments, the second (e.g., intermediate) region is inflated to an intermediate height to provide support to swollen, healing tissue of the patient without putting undue pressure on the patient. In some embodiments, the transitioning of the support comprises inflating or deflating the first, second, and/or third region independently and/or in correspondence with the other regions. In some embodiments, the support is positioned, prior to contact with the patient, in optimal locations based on the patient's body size and shape (e.g., height, width, relative position of body regions, location of injuries, etc.). In some embodiments, one or more support components are positioned, after contact with the patient, in optimal locations based on the patient's contact positions with those support components. Positioning may be conducted before or after or during transitioning of any one or more support components from a lower position to a raised position or vice versa. In some embodiments, positioning indicators are provided on any of the system sub-components to assist in optimal positioning based on the patient size and shape. In particular, such indictors facilitate positioning system components in optimal positions prior to placing the patients on the support. In some embodiments, the indicators include but are not limited to, numbered segments, symbolic icons, letter-coded segments, patterned segments, text labels, graphic symbols, braille markings, geometric shapes, barcodes/QR codes, LED indicators, grooved segments and/or a combination thereof.

Further provided herein is a system comprising any of the supports described herein mounted on or integrated into a surgical support device or system (e.g., bed frame, table, etc.). In some embodiments, the system further comprises a control system for automated removal or transition of the second (e.g., intermediate) region from a first position in contact with the patient to a second position not in contact with the patient. In some embodiments, the control system is battery operated. In some embodiments, the battery is the primary or only power source. In some embodiments, the battery is the secondary power source. In some embodiments, the system further comprises a pump that delivers a fluid to or removes a fluid from said support. In some embodiments, the fluid is air. In some embodiments, fluid is heated or cooled to thermoregulate one or more regions of the support. In some embodiments, heated fluid is employed to prevent hypothermia.

In some embodiments, the support, or a surgical support device or system that resides under the support or that integrates the support, is transitioned to create a tilted region to tilt one or more body parts of the patient relative to others (e.g., to elevate a patient torso, leg, arm, etc.). In some embodiments, the tilt is utilized to generate a Trendelenburg position, a reverse Trendelenburg position and/or a lateral position. In some embodiments, the support or a surgical support device or system under the support comprises a tilt sensor and/or a tilt mechanism to prevent the support from undesirable tilting horizontally or vertically.

In some embodiments, the system further comprises a light source. In some embodiments, the light source comprises a reflective material. In some embodiments, the light source comprises an attachment configured to attach the light to the support or to a patient support device.

In some embodiments, the supports, systems, or methods further comprise medical grade drapes (e.g., surgical drapes) configured for use with the support. For example, in some embodiments, drapes are provided in one or more segments that correspond to individual regions of the support and/or that overlap regions of the support. In some embodiments, the medical grade drapes are sized to cover one or more regions of said support. In some embodiments, the drapes are disposable.

DETAILED DESCRIPTION

Provided herein are body support devices, systems, and methods having one or more regions that are removable and/or transitionable from a first position supporting a portion of a patient body to a second position not supporting the portion of the patient body so as to allow surgical access to any portion of a patient body around a 360° circumference without requiring repositioning of the body or body part (e.g., allowing surgical access to the posterior, anterior, and lateral sides of the patient or patient body part while the patient is in a supine, prone, or lateral position on the support) or minimizing the number of repositioning events needed.

Figure 1:
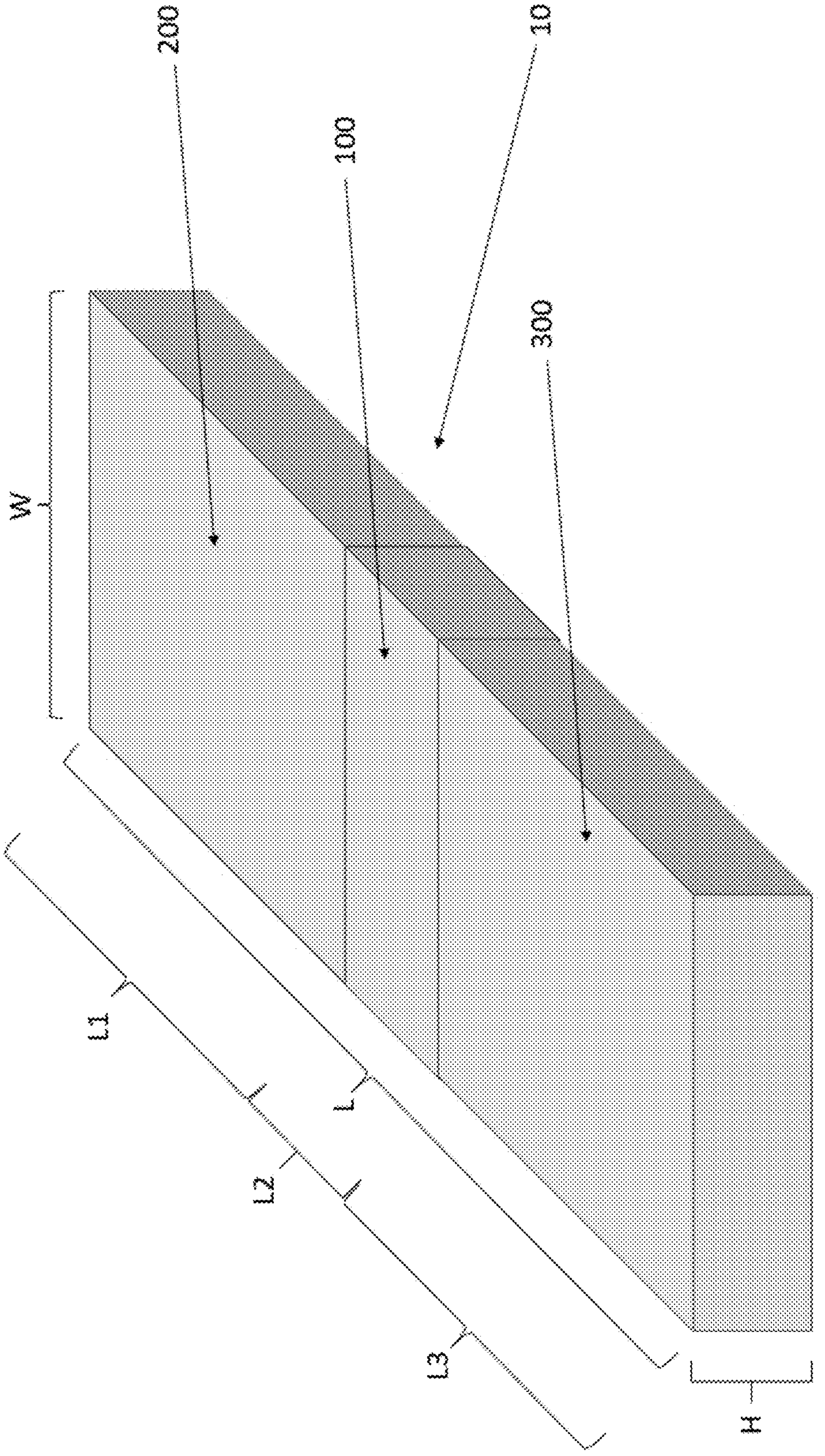
FIG. 1 shows an exemplary support device.

FIG. 1 provides an exemplary layout of a support device 10. The support 10 comprises three regions, a first (e.g., proximal) region 200, a third (e.g., distal) region 300, and a second (e.g., intermediate) region 100. Each region has a length (L), width (W), and height (H). The length, width, and height of each region may be the same or may differ from one another. Typically, the length of the proximal region (L1) and distal region (L3) is longer than the length of the intermediate region (L2), however, this need not be the case. Typically, the width of the three regions is the same or substantially the same. However, this need not be the case. In some embodiments, the width of the proximal region 200 is wider than the width of the intermediate region 100 or the distal region 300 so as to accommodate a patient's wide torso. Typically, the height of the three regions is the same or substantially the same so as to create a substantially planar support surface for a patient. However, in some embodiments, where an underlying component (e.g., surgical bed frame) does not present a planar surface, the heights of the regions may vary to establish a planar surface or substantially planar surface for the patient. In some embodiments, where it is desired to elevate or tilt a portion of the patient's body (e.g., feet, legs, head, torso), one or more of the regions may vary in height from its proximal end to its distal end or vice versa, or the support regions, of equal height, may be designed to match a tilt provided by an underlying surgical bed frame. In some embodiments, one or more support regions have shapes and dimensions (e.g., angles) allowing flexing of the bed while maintaining the patient in a desired position. In some embodiments, one or more support regions may be compressible (e.g., accordion-like) or stretchable allowing flexing of the bed while maintaining the patient in a desired position.

In some embodiments, any one or more components of the support may change in shape or size (or be replaced with components of different shape or size) to accommodate changes in a bed, for example, flexing of a bed during a procedure. For example, during certain procedures (e.g., abdominoplasty), it is common to flex a bed at the waist. In some embodiments, the support is designed to maintain the body in an optimal position in any bed position. For example, regions may deflate partially or fully or be elevated or lowered (e.g., to prevent tilting). Segments might change shape or be replaced with appropriately shaped segments. In some embodiments, the interface with a bed is such that one or more or all of the support regions maintain their shape, independent of the bed movement. In some embodiments, the support is fully integrated as part of the bed.

In some embodiments, the support is designed to position the body in a desired position. Any one or more components of the support may change in shape or size (or be replaced with components of different shape or size) to achieve the desired position. For example, during procedures where it is common for the patient to be in an inclined position, the support is designed to position the patient in a desired position. For example, regions may deflate partially or fully or be elevated or lowered (e.g., to prevent tilting). Segments might change shape or be replaced with appropriately shaped segments.

Figure 2:
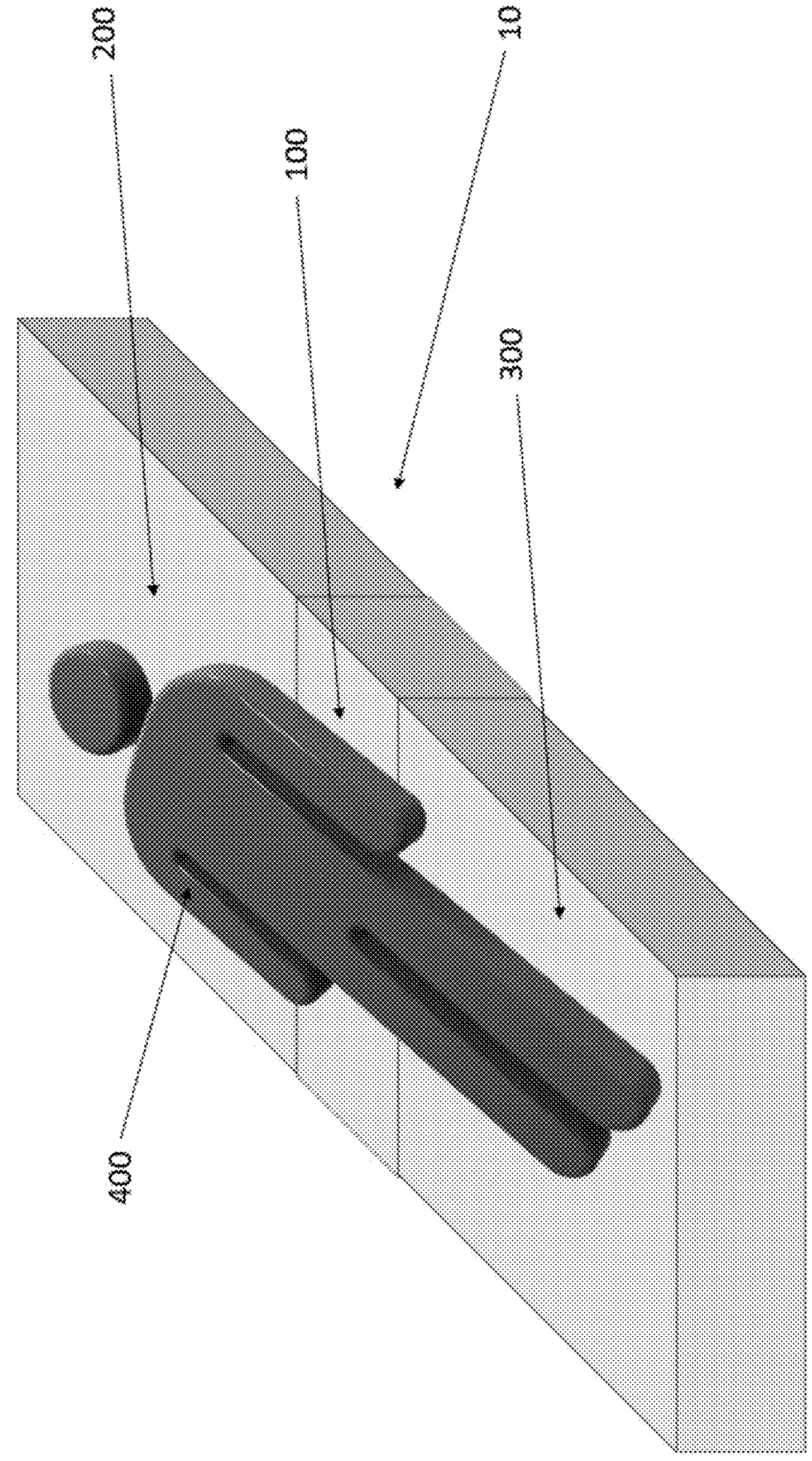
FIG. 2 shows an example of patient positioning on an exemplary support device.

FIG. 2 shows a model of a patient 400 (not shown to anatomical accuracy) in a supine position on the support 10. In this example, the patient 400 is positioned such that the patient's head and torso is supported by the proximal region 200, the legs are supported by the distal region 300, and the buttocks and lower back is supported by the intermediate region 100. In this position, a surgical procedure (e.g., liposuction) may be performed on the posterior side of the patient. The lengths of the three regions may be selected, as desired, to locate the intermediate region 100 under any portion of the patient's body where posterior access is desired (e.g., the intermediate region 100 could be located under the legs, under the torso, under the neck, etc.).

Figure 3:
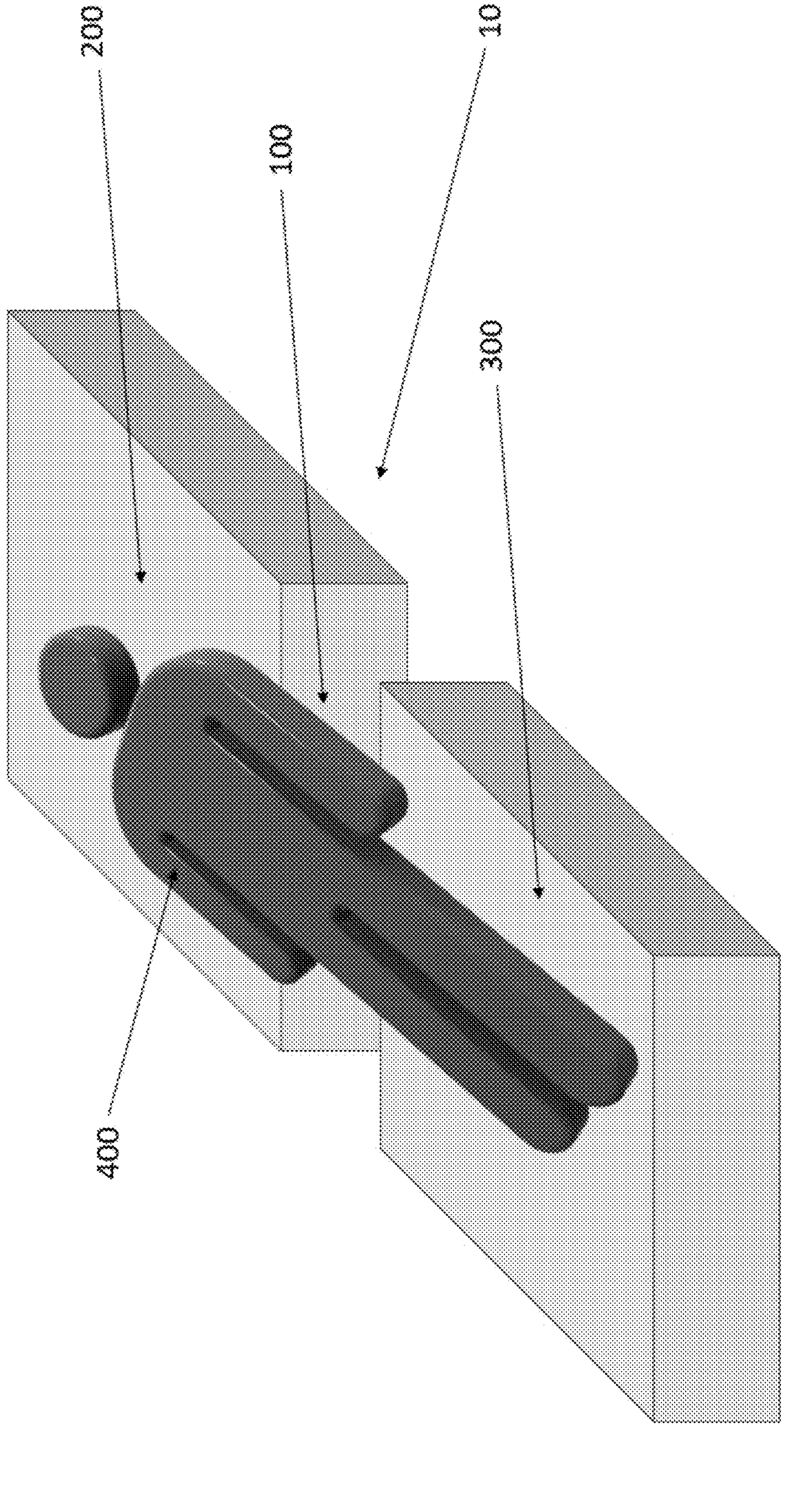
FIG. 3 shows an example of patient positioning on an exemplary support device where an intermediate region of the support device is removed.

FIG. 3 shows the supported patient 400 of FIG. 2 with the intermediate region 100 removed. The patient's body remains supported by the proximal region 200 and distal region 300, while creating access to the posterior side of the patient in the region previously occupied by the intermediate region 100. In this position, a surgical procedure (e.g., liposuction) may be performed on the posterior side of the patient, while the patient remains in a supine position on the support 10.

Figure 4:
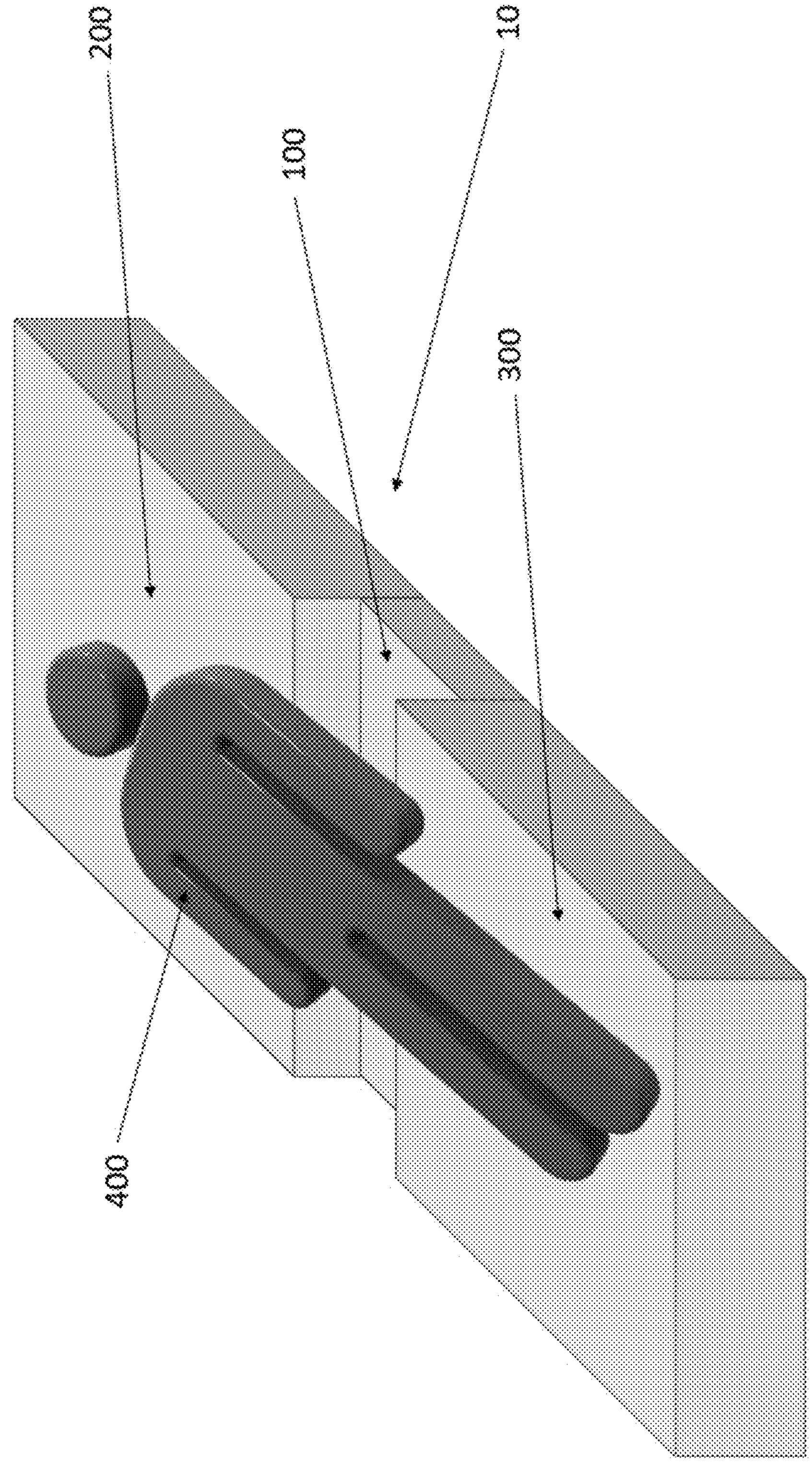
FIG. 4 shows an example of patient positioning on an exemplary support device where an intermediate region of the support device is minimized (e.g., deflated).

FIG. 4 shows the supported patient 400 of FIG. 2 with the intermediate region 100 deflated or otherwise reduced in height. The patient's body remains supported by the proximal region 200 and distal region 300, while creating access to the posterior side of the patient in a region previously occupied by the full height form of the intermediate region 100. In this position, a surgical procedure (e.g., liposuction) may be performed on the posterior side of the patient, while the patient remains in a supine position on the support 10.

Figure 5:
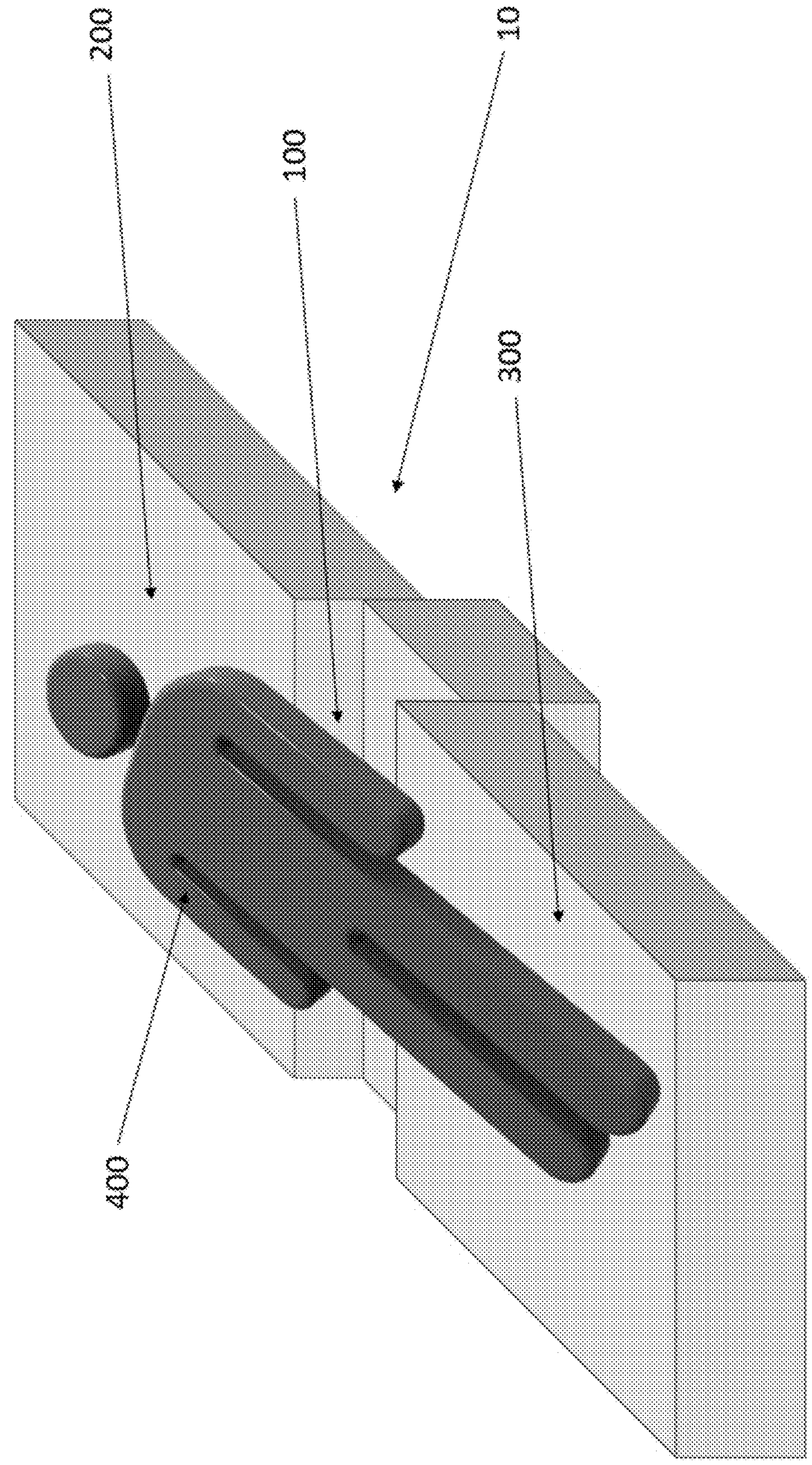
FIG. 5 shows an example of patient positioning on an exemplary support device where an intermediate region of the support device is lowered.

FIG. 5 shows the supported patient 400 of FIG. 2 with the intermediate region 100 lowered relative to the proximal region 200 and distal region 300. The patient's body remains supported by the proximal region 200 and distal region 300, while creating access to the posterior side of the patient in a region previously occupied by unlowered form of the intermediate region 100. In this position, a surgical procedure (e.g., liposuction) may be performed on the posterior side of the patient, while the patient remains in a supine position on the support 10. Alternatively, the proximal region 200 and/or distal region 300 may be raised to create a similar affect (not shown). In some embodiments, the lifting and lowering mechanism employs one or more of pneumatic, hydraulic, mechanical, or other mechanisms.

Figure 6:
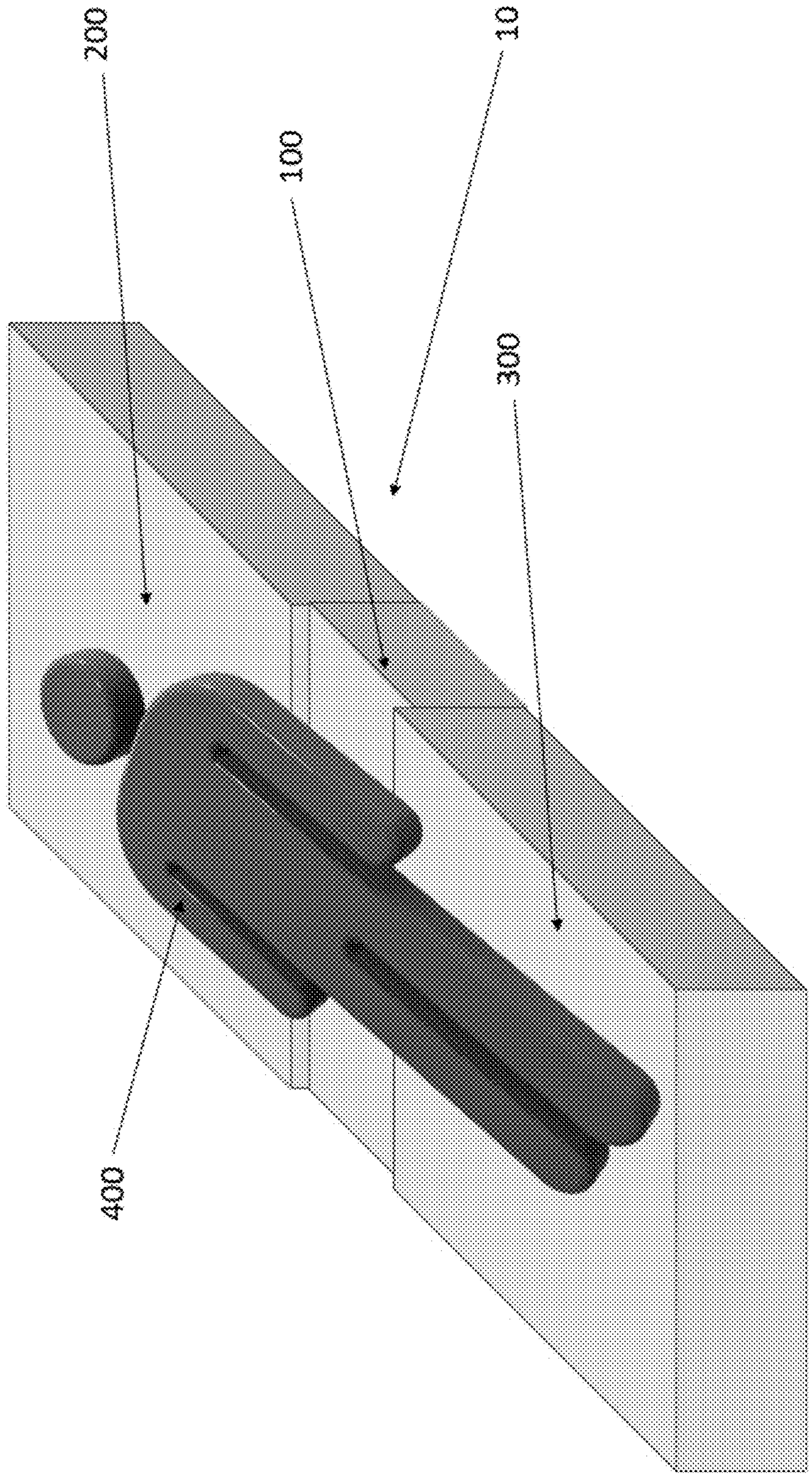
FIG. 6 shows an example of patient positioning on an exemplary support device where an intermediate region of the support device is modified to provide appropriate patient support for healing after a procedure.

FIG. 6 shows the supported patient where the intermediate region 100 has a slightly reduced height relative to the proximal region 200 and distal region 300. In some embodiments, this configuration of the intermediate region 100 is desired to provide some support to a region of the patient that has undergone a surgical procedure (e.g., liposuction), while not applying undue pressure that would interfere with patient healing and comfort. This configuration can be achieved by any desirable mechanism: e.g., replacing a full height intermediate region 100 with an intermediate region 100 of lesser height; partially reinflating a deflated intermediate region 100; partially raising a lowered intermediate region 100, etc.

Figure 7:
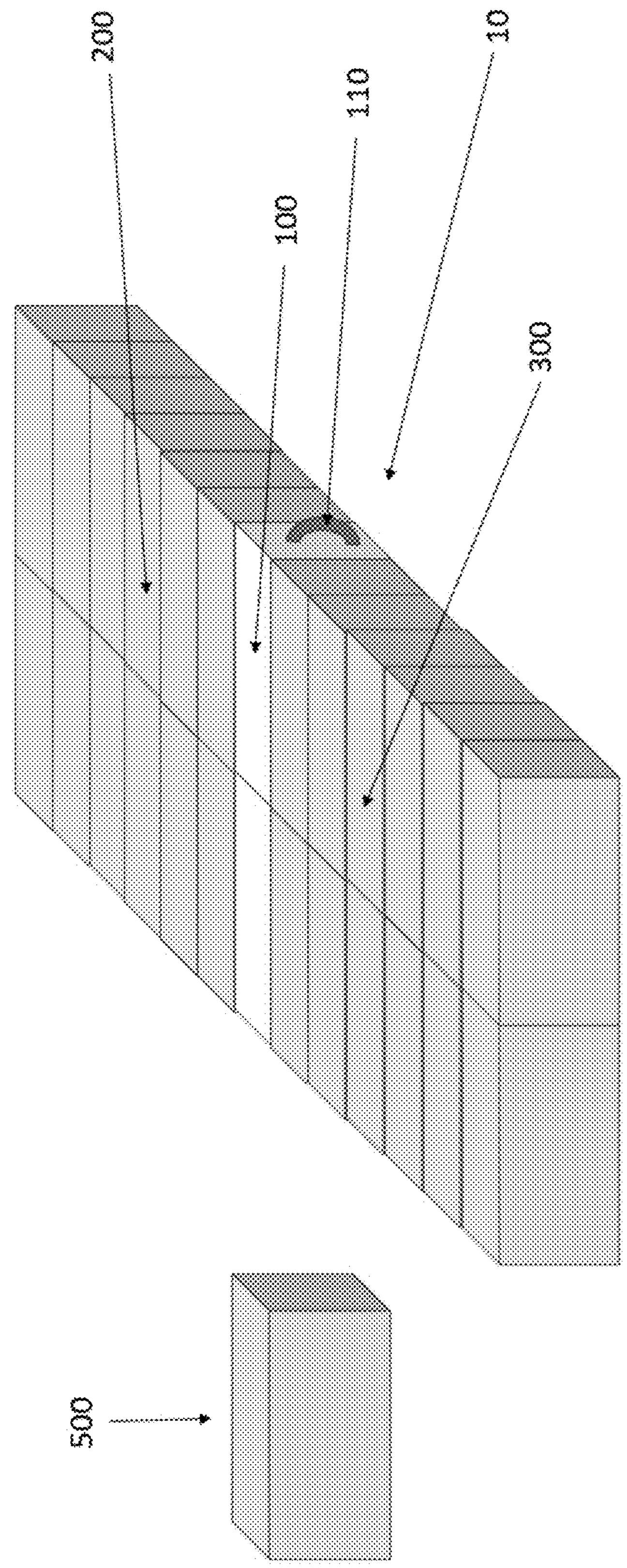
FIG. 7 shows an exemplary support device assembled from modular units.

A variety of form factors may be employed to provide the support. In some embodiments, the support is a single construction. In some such embodiments, the support is inflated with a fluid (e.g., air, water, etc.) and comprises interior dividers that allow for deflation or inflation of different regions of the support independently of one another. In some embodiments, the support comprises two or more (3, 4, 5, 6, 7, 8, 9, 10, etc.) separate sub-components that are assembled together to form the full support. For example, FIG. 7 shows an embodiment where each of the proximal region 200, intermediate region 100, and distal region 300 are formed from a plurality of individual block units 500. Any size and number of blocks may be used, as desired. Different sized blocks can be used within a single support assembly. The block assembly approach provides the advantage of customizability. Different sized blocks can be used with different patients to accommodate the patient's body dimensions. Likewise, different sized blocks can be used in different regions of the support. The specific sizes (length, width, height) of the intermediate region may be selected to optimally define the region of surgical access for a particular patient. In some embodiments, kits are provided comprising a plurality of differently sized individual unit blocks. The optimal set of blocks is assembled, prior to surgery, for a specific patient based on the dimensions of the patient and the location of the surgical procedure. In some embodiments, software is provided that assists a health care facility to identify and select the optimal set of blocks for a particular patient based on patient dimensions (e.g., from a photograph, from imaging data, from height/weight information, from body measurements, etc.) and/or a particular procedure (e.g., liposuction on particular body regions). In some embodiments, individual blocks comprise fasteners for locking a block to one or more of its adjacent blocks. In some embodiments, individual blocks comprise handles, straps or other grippable features to facilitate handling and movement of blocks. For example, in FIG. 7, an intermediate region 100 block comprises a handle 110 to facilitate removal of the block after a patient is positioned on the support 10. In some embodiments, one or more subsections of the support 10 are shaped to accommodate body components of the patient. For example, proximate region 200 may be tapered in the shape of a torso and may optionally comprise regions on one or both sides to accommodate support of the patient's arms. Straps and stabilization components may be provided on the upper surface of the support 10 to manage, control, or support body parts such as arms, legs, and the head of the patient.

Figure 9:
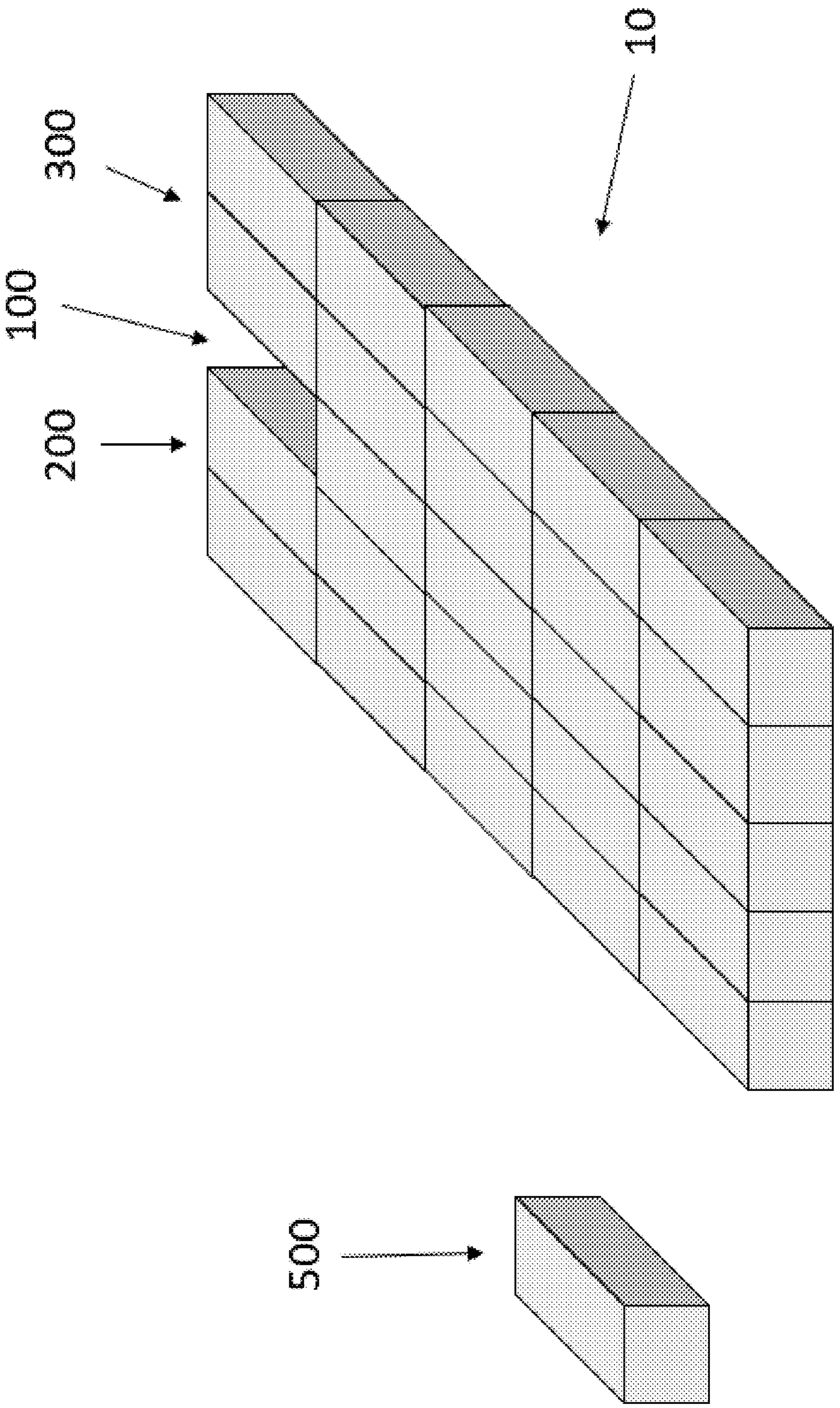
FIG. 9 shows an exemplary support device assembled from modular units with an intermediate region removed.

The intermediate region may be located in any portion of the support where access to the underside of the patient is desired. For example, FIG. 9 shows a support 10 composed of a plurality of individual block units 500. In this instance, the support is designed to provide support for a patient's head while allowing access to the underside of the head (e.g., for intracranial surgeries, procedures on the back of the head, etc.). In this instance, the proximal region 200 supports the right side of the patient's head, the distal region 300 supports the left side of the patient's head, and the intermediate region 100 provides a region in which an individual block unit, if present (not shown) supports the middle of the head, and if absent, lowered, or deflated, etc. (shown) provides access to the back of the supported head.

The second (e.g., intermediate) region may be associated with any body position where access to multiple sides of the body region is desired. For example, the second region may be positioned under arms or legs (e.g., thighs) to allow surgeries on the arms or thighs (e.g., such as a thigh lift or arm lift).

Figure 10B:
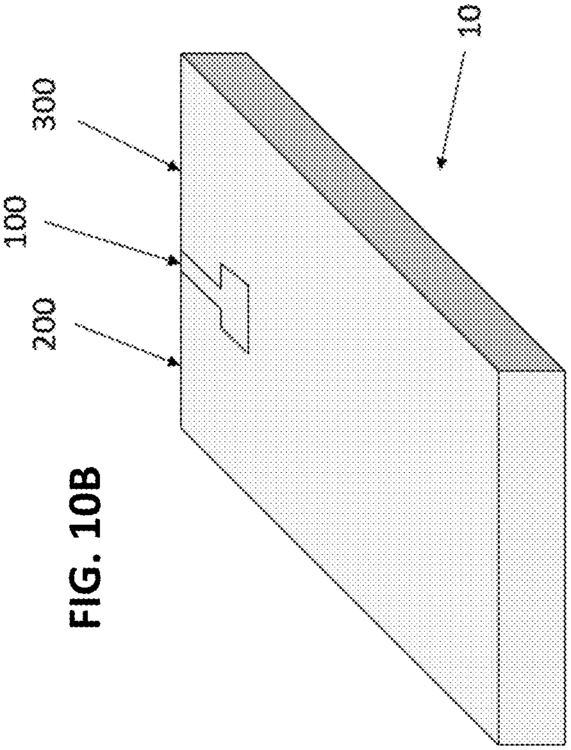
FIG. 10B show a similar device having an alternatively shaped intermediate region.
Figure 10A:
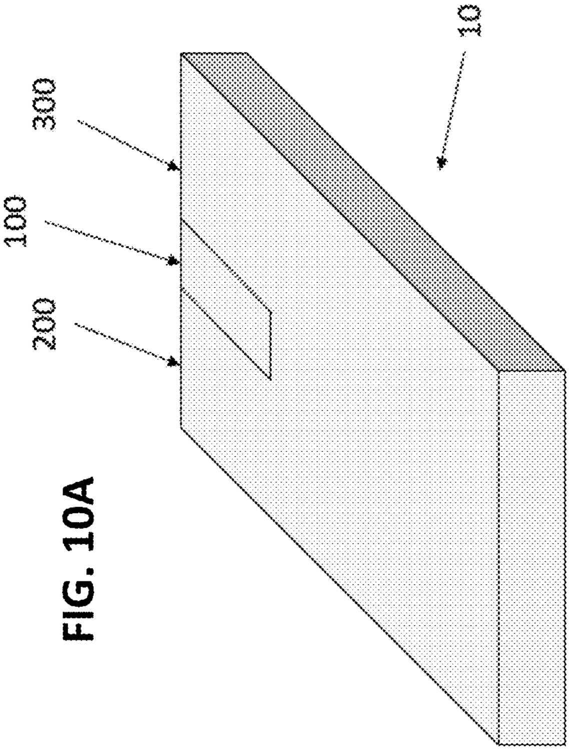
FIG. 10A shows an exemplary support device having proximal and distal region as part of a single construction.

In some embodiments, the proximal region and distal region are physically connected to one another or form regions of a single construction. For example, FIG. 10A shows a support 10 having a removable, lowerable, deflatable, etc., intermediate region 100 separating a proximal region 200 and distal region 300 that are sub-regions of a single construction. FIG. 10B shows a similar support 10, but where the removable, lowerable, deflatable, etc. intermediate region 100 is shaped to provide a narrower access channel that terminates into a larger surgical zone, which may be of any desired size and shape. If the intermediate region is modified from a supporting position to non-supporting position after the patient is placed on the support, in some embodiments, it may be preferable to deflate or lower the intermediate region, as lateral removal of complex shapes may present a challenge, depending on the materials used to construct the intermediate region support. Sub-portions of the intermediate region may be differentially lowered, deflated, or removed relative to other sub-portions. For example, in FIG. 10B, the narrower access channel may be only partially removed, lowered, or deflated, while the larger surgical zone is fully removed, lowered, or deflated to provide a support base for a medical device (e.g., endoscope, support arm) in the channel, while providing a greater degree of movement and positioning in the larger surgical zone.

Figure 8:
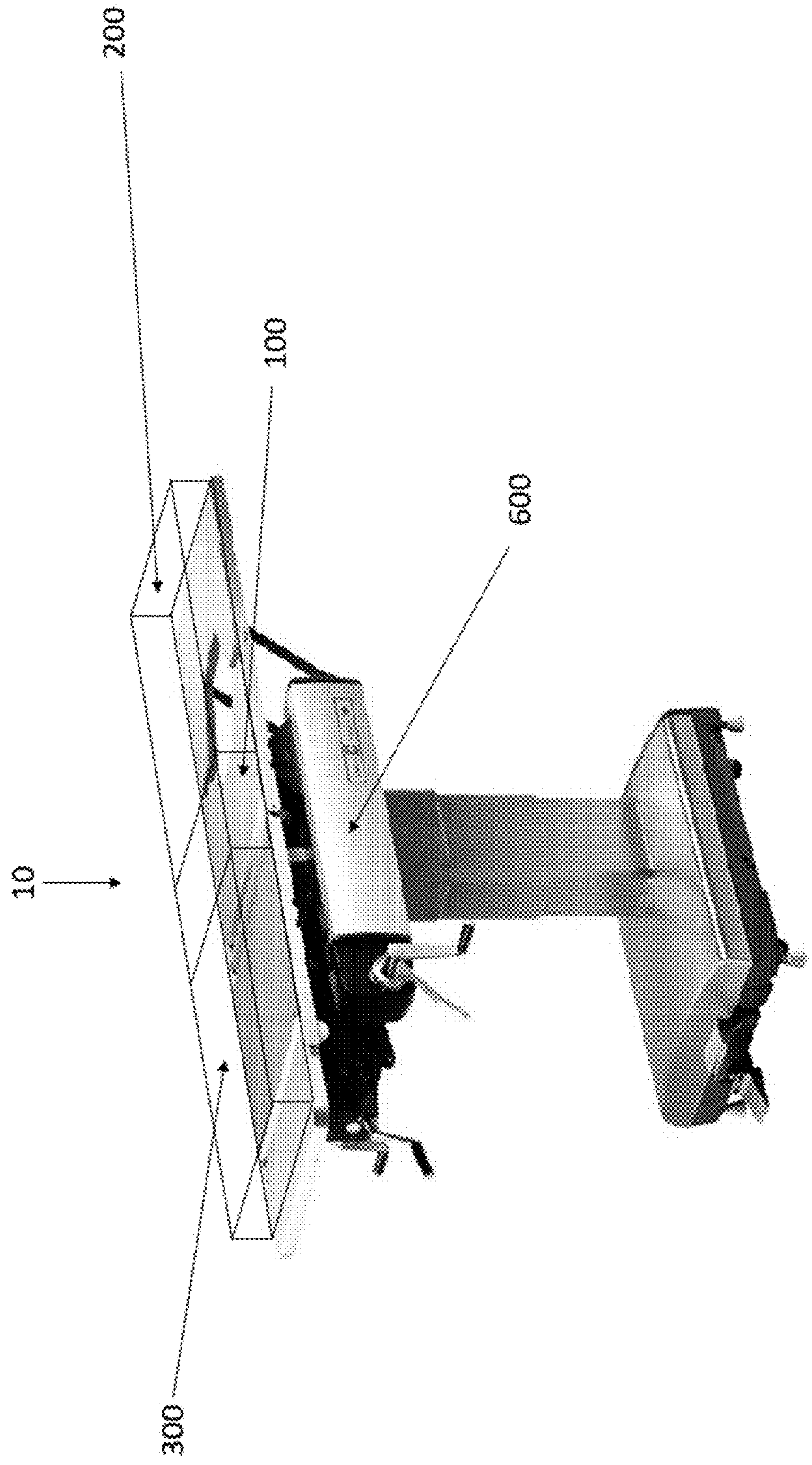
FIG. 8 shows an exemplary support device mounted on a surgical table.

In some embodiments, the support is used on its own. In some embodiments, the support is manufactured as an individual component. In some embodiments, the support is mounted onto or integrated into a surgical bed frame, surgical table, or other surgical support device or system. An example of such a system is shown in FIG. 8 where the support 10, comprising the proximal region 200, intermediate region 100, and distal region 300 is shown mounted onto a surgical support device or system 600 (e.g., AMSCO 2080M Manual Surgical Table). In some embodiments, the support is manufactured as a component of a surgical bed frame, table, or other surgical support device. Such embodiments are particularly relevant where there is a desire to lower (e.g., hydraulically lower) the intermediate region 100 of the support relative to the proximal and distal regions. In such embodiments, the underlying surgical support frame, table, or other support device or system may comprise a manual or automatic moveable subcomponent (not shown) that can be actuated to lower the subcomponent, resulting in a lowering of the intermediate region 100 of the support 10. In some embodiments, the underlying surgical bed frame, surgical table, or other surgical support device or system may comprise a surface feature (e.g., mechanical feature, layer, coating, etc.) to facilitate fixed attachment of the lower surface of support 10 to the upper surface of the surgical support device or system 600. In some embodiments, the surface feature is a mechanical attachment (snap, hook, latch, etc.) that may interface with a corresponding mechanical attachment on the bottom surface of the support 10. In some embodiments, a hook and loop fastener (e.g., VELCRO fastener) is employed. In some embodiments, particularly where a region is to be removed after positioning of a patient, no surface attachment is employed to minimize the effort required to remove the region (e.g., the intermediate region 100 is not fastened to the surface of the surgical support device or system 600). In some embodiments, where removal is desired, respective contacting surfaces are designed or treated to minimize the coefficient of fraction. In some embodiments, the surgical support device or system 600 comprises tubing and a two-way pumping system (not shown) that connects to intermediate region 100 of support 10 to transfer fluid to and from intermediate region 100 to deflate or inflate intermediate region 100. In some embodiments, the tubing and pumping system is provided as part of surface 10 or as an independent stand-alone component. In some such embodiments, intermediate region 100 comprises one or more ports for connection to the tubing to facilitate transfer of fluid during deflating and/or inflating events.

In some embodiments, one or more or all of the components of the support are designed for single use (e.g., are disposable). In other embodiments, one or more or all of the components of the support are designed for multiple uses and permit appropriate cleaning and/or sterilization between uses. For example, in some embodiments, the support components comprise a foam interior covered by a removable fabric exterior where the exterior is removed and disposed of after use or removed and cleaned and/or sterilized.

The support devices and systems find use with any method where surgical or other procedural access to one or more sides (e.g., posterior side, laterals sides, and/or anterior side) of the subject is desired when the subject assumes a particular position (e.g., supine) on the support. Such procedures include, but are not limited to, liposuction, fat transfer procedures (e.g., Brazilian butt lift), skin excision procedures such as abdominoplasty and body lifts, bone fusions, bone replacements, back surgeries, spine surgeries and procedures, tendon surgeries, pelvic surgeries, reproductive health procedures, skin surgeries, cancer surgeries and treatments, wound repair (e.g., bullet wounds, pass-through puncture wounds, etc.), and the like. The support devices and systems find particular use with medical procedures that involve or require access to both the anterior and posterior side, or any combination of body surfaces, of the patient. Such methods include liposuction and ablations procedures (e.g., tumor ablation) that employ multiple probes inserted into different sides of a patient's body. For example, many liposuction procedures involve introduction of the liposuction cannula to both the anterior and posterior sides of the body. In current clinical practice, this involves treating one side, turning the patient over, typically under general anesthesia, and performing the treatment on the other side, with all of the risks and liabilities associated therewith for the patient and healthcare workers and facility. With the technology provided herein, the liposuction procedure can be carried out on both the anterior and posterior sides of the patient, as well as lateral sides, while the patient remains in the supine position on the support. Removal or minimization of the intermediate region of the support provides the needed physical space below the patient for the treating clinician use the liposuction cannula while the patient remains supine.

Figure 11:
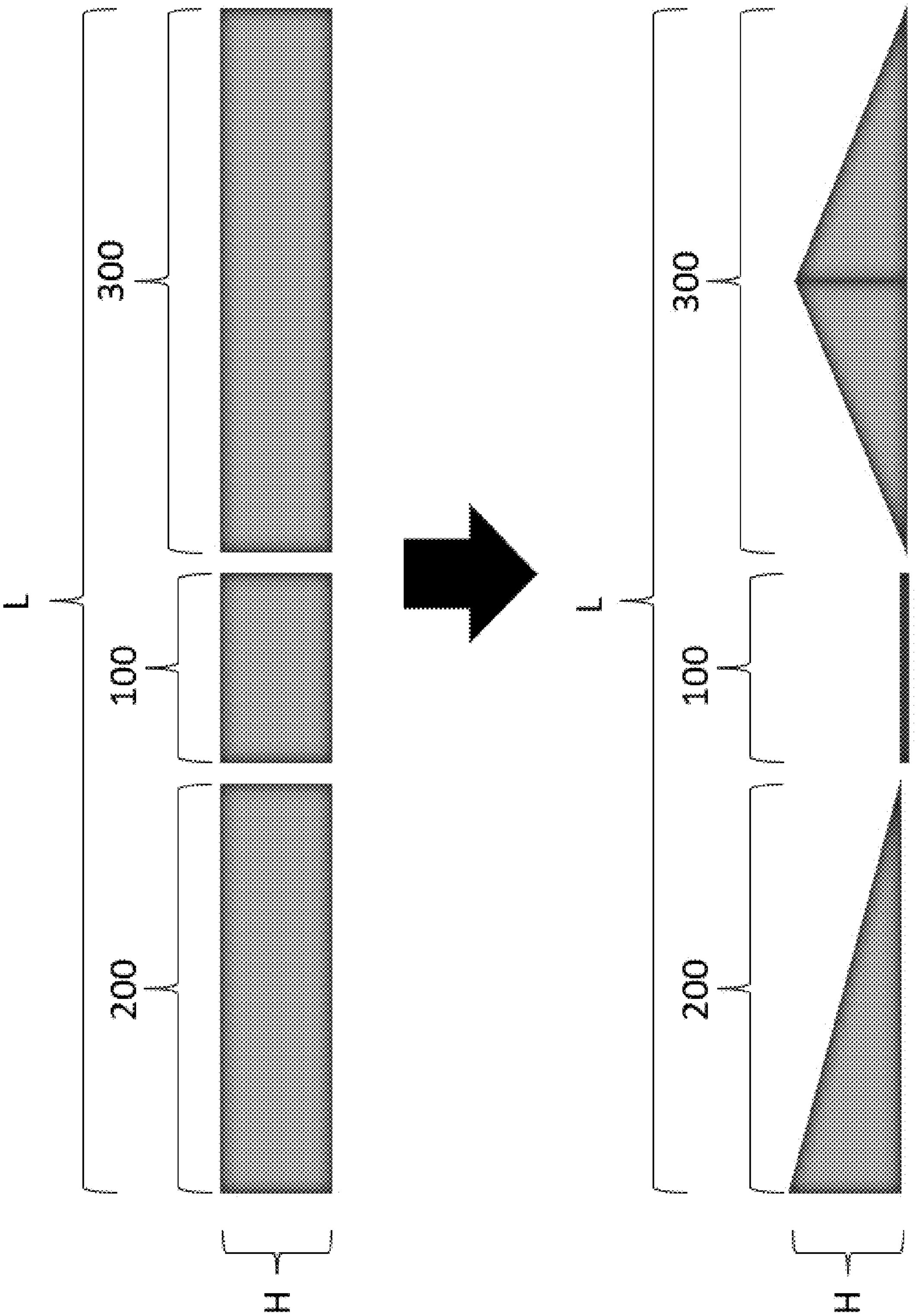
FIG. 11 shows an exemplary support device having a proximal, intermediate, and distal regions wherein the proximal, intermediate, and distal regions transition to support a supine patient wherein the patient's upper body and knees are elevated.
Figure 12:
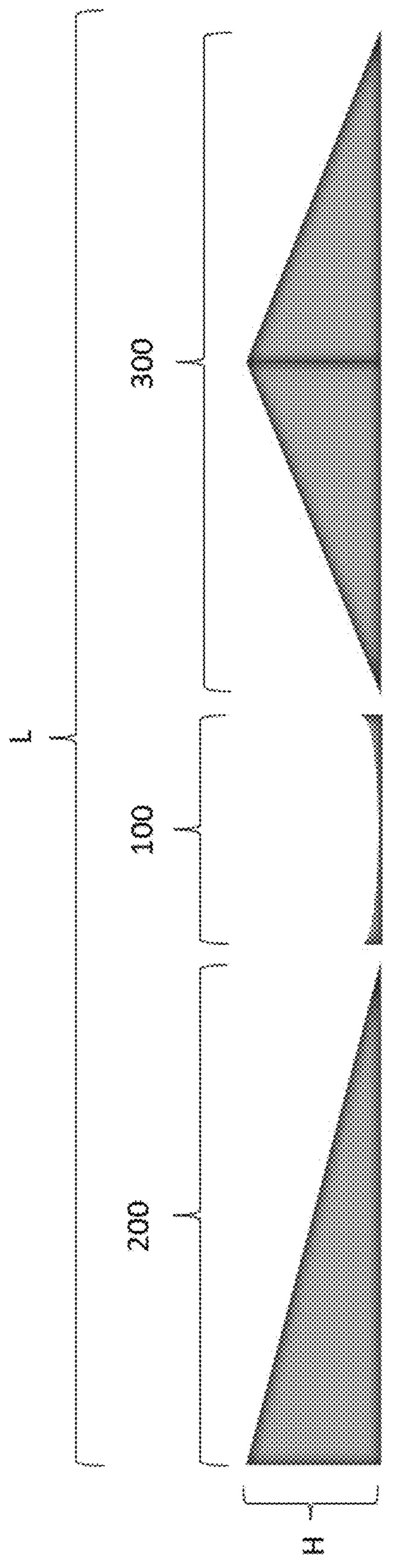
FIG. 12 shows an exemplary support device having a proximal, intermediate, and distal regions wherein the proximal, intermediate, and distal regions transition to support a supine patient wherein the patient's upper body and knees are elevated, and the intermediate region is contoured.

In some embodiments, the support is capable of transitioning to support a supine patient's upper body and knees above the buttocks. An example of such an embodiment is shown in FIG. 11 where the support, comprising the proximal region 200, intermediate region 100, and distal regions 300 are shown transitioning from a first position wherein the proximal 200, intermediate 100, and distal 300 regions hold a supine patient level to a second position wherein the proximal 200 region elevates a patient's upper body above the buttocks, the proximal region 300 elevates a patient's knees above the buttocks, and the intermediate region 100 holds a patient's buttocks below the patient's upper body and knees. In some embodiments, the intermediate region 100 is in contact with the patient's buttocks. In some embodiments, the intermediate region 100 is not in contact with the patient's buttocks. In some embodiments, the proximal 200 and distal 300 regions elevate the patient's upper body and lower body in such a way that the patient's buttocks are not in contact with the intermediate region 100. In some embodiments, the proximal 200 and distal 300 regions elevate the patient's upper body and lower body in such a way that patient's buttocks are in contact with the intermediate region. In some embodiments, the intermediate region is contoured to hold the patient's buttocks. An example of such an embodiment is shown in FIG. 12 where the support, comprising the proximal region 200, intermediate region 100, and distal regions 300 are shown and the proximal region 200 is elevating the patient's upper body above the patient's buttocks, the distal region 300 is elevating the patient's knees above the buttocks, and the intermediate region 100 is contoured to hold the buttocks. In some embodiments, the configuration shown in the lower panel of FIG. 11 is employed when a procedure is conducted on the upper surface of a patient. To access a side or lower surface of the patient (e.g., the buttocks), all or a portion of proximal region 200, distal region 300, or intermediate region 100 is inflated or elevated to support the patient's body on either side of the surgical target region, while leaving a gap below the surgical target region. In some embodiments, this is accomplished by transitioning proximal region 200 and/or distal region 300 to a partially or fully raised/inflated position. In some embodiments, intermediate region 100 comprises two or more sub-regions (e.g., three, four, five, etc.) and one or more the subregions on either side of the surgical target region are inflated/raised while one or more subregions under the target surgical region remain lowered. In some embodiments, one more of the support regions (e.g., proximal region 200, distal region 300) comprise two or more internal chambers allowing for independent inflation/deflation of the different chambers. In some such embodiments, this allows for a sloping support structure (e.g., as shown in the bottom panel of FIG. 11) when one chamber is deflated while another remains inflated. In some embodiments, combinations of inflatable support components and non-inflatable support components (e.g., cushions) are utilized.

Figure 13:
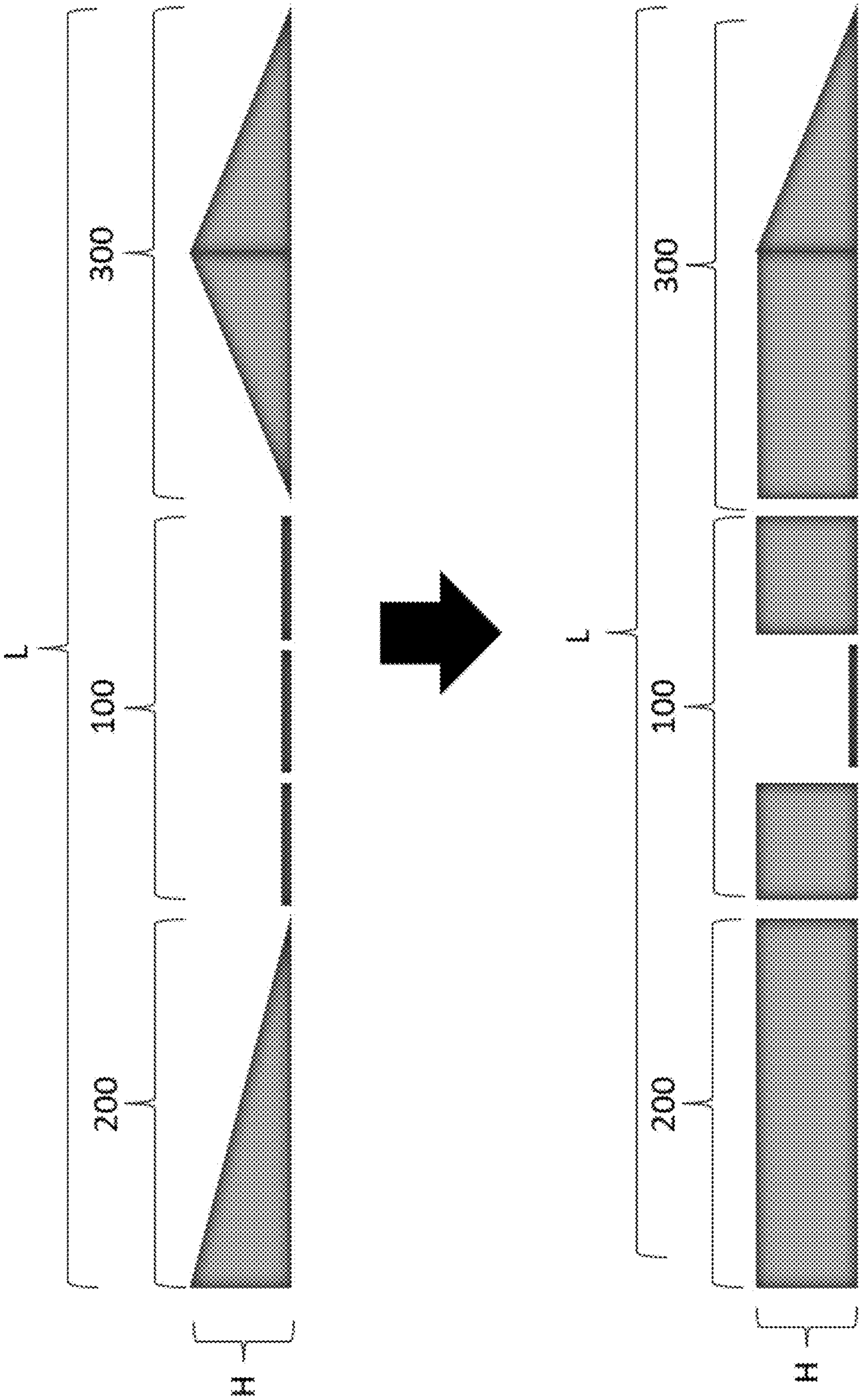
FIG. 13 shows an embodiment of the support where the proximal, intermediate, and distal regions are all inflated to different extents.

FIG. 13 shows an embodiment of the support where the proximal, intermediate, and distal regions are all inflated to different extents, changing shape between a first position and a second position. Any of the regions may be changed in shape by inflating, lowering, and/or removing and replacing the region. In the illustrated embodiment, the support comprises the proximal region 200, the intermediate region 100, and the distal region 300. The intermediate region 100 further comprises three separate intermediate components. The distal region 300 further comprises two separate distal components. In some embodiments, any region may comprise two or more separate components. In some embodiments, one more of the regions comprise two or more internal chambers allowing for independent inflation/deflation of the different chambers, which allows for a sloping support structure when one chamber is deflated while another remains inflated.

The top panel depicts a first position for the support. In the illustrated embodiment, the proximal region 200 is partially raised/inflated, forming an inclined position. In the illustrated embodiment, each of the three separate intermediate pieces are fully lowered (or removed or deflated). In the illustrated embodiment, a first separate distal component is in an inclined position. A second separate distal component is in a declined position. The distal region forms an arched shape. For example, this desired position has a patient's upper body inclined, with their legs bent. The patient's head is roughly at the same height as the patient's knees.

In some embodiments, the support is arranged in the first position to begin a procedure. In some embodiments, the support is transitioned into the first position from some other position.

The bottom panel depicts a second position for the support. The second position is generally a desired position for a procedure. In some embodiments, all the regions of the support are changed in shape from the first position to the second position. In some embodiments, some of the regions of the support are changed in shape from the first position to the second position.

In the illustrated embodiment, the proximal region 200 is fully raised/inflated (or the proximal region is replaced by a new proximal region with the changed shape), changed in shape from the previous partially raised/inflated position. In the illustrated embodiment, a first intermediate sub-component is fully raised/inflated (or replaced), changed in shape from the fully lowered/deflated (or removed) position. A second intermediate sub-component remains fully deflated/lowered. A third intermediate sub-component is fully raised/inflated (or replaced) changed in shape from the fully lowered/deflated (or removed) position. In the illustrated embodiment, the first distal sub-component is fully inflated/raised (or replaced), changed in shape from the previous partially inflated/raised position. The second distal sub-component remains partially inflated/lowered. The second position provides access to different areas of a patient's body than the first position. The second position creates space above the second intermediate sub-component. For example, the second position raises and supports a patient's upper back and upper leg areas, while providing access to the patient's buttocks and/or lower back from underneath.

In the second position, the proximal and distal regions are changed in shape to further support a patient's body. In some embodiments, any of the regions may be changed in shape to adjust the support for a patient, depending on the support needs of the specific patient (e.g., adjusting for the patient's height, width, weight, etc.).

Figure 14:
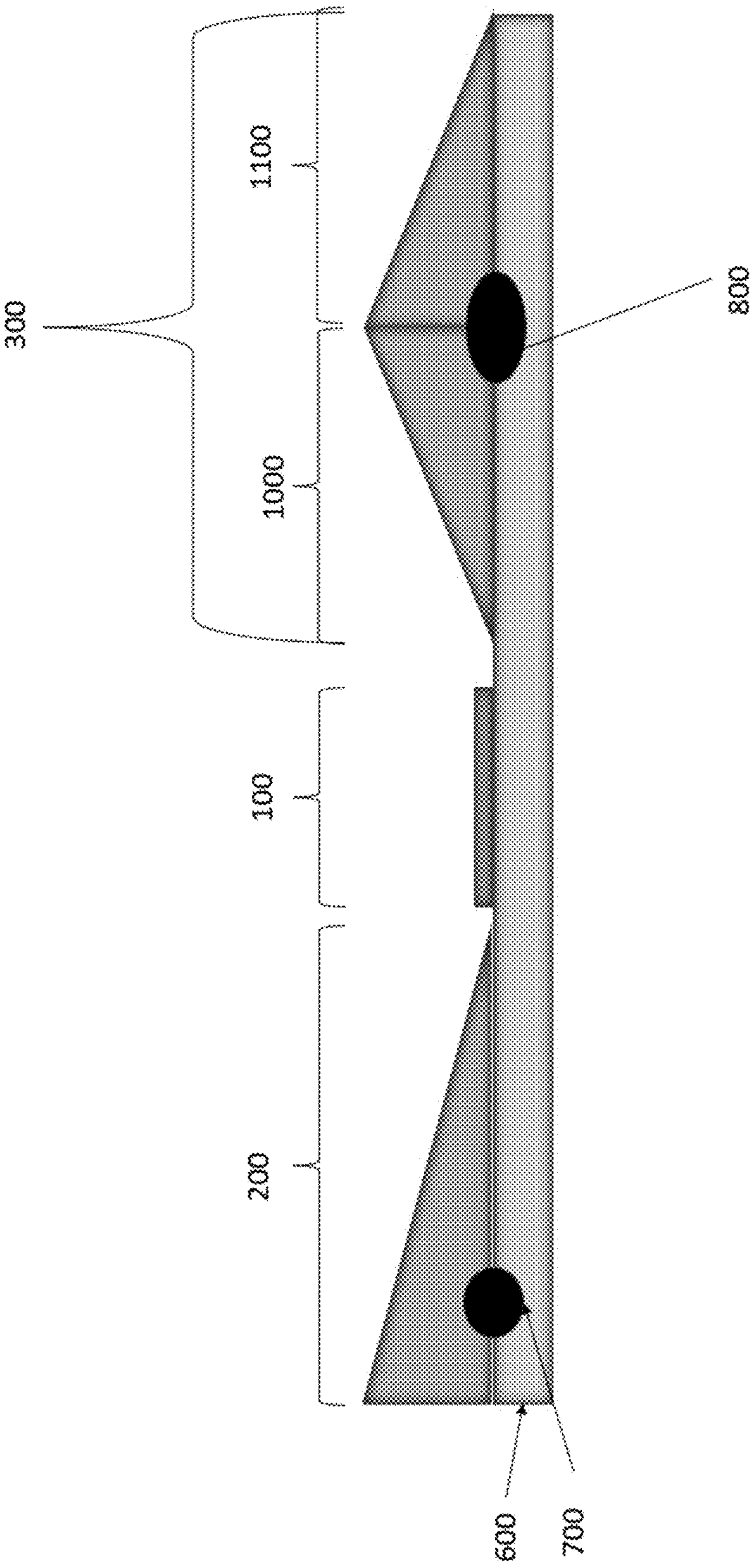
FIG. 14 shows an embodiment of the support, adjusted to a desired position on a surgical support device or system.

FIG. 14 depicts an embodiment of the support, adjusted to a desired position on a surgical support device or system. In the illustrated embodiment, the support comprises the proximal region 200, the intermediate region 100, and the distal region 300. In some embodiments, the proximal region 200 can be changed in shape to form a desired position. In some embodiment, the proximal region 200 is changed in shape by removing (and/or replacing), lowering, deflating, etc. In the illustrated embodiment, the proximal region 200 is changed in shape, creating an inclined position. The incline position is useful in procedures where the procedure is completed with the patient in an inclined position.

In some embodiments, the intermediate region 100 is changed in shape to form a desired position. In some embodiment, the intermediate region 100 is changed in shape by removing (and/or replacing), lowering, deflating, etc. In the illustrated embodiment, the intermediate region 100 is changed in shape, where the intermediate region 100 is fully lowered, or deflated, (or removed) etc. The intermediate region being fully deflated, lowered, or removed allows access to the backside of a patient.

In the illustrated embodiment, the distal region 300 is comprised of two separate pieces. In some embodiments, the distal region is comprised of more than two separate pieces. In some embodiments, the distal region is changed in shape to form a desired position. In some embodiment, the distal region 300 is changed in shape by removing (and/or replacing), lowering, deflating, etc. In the illustrated embodiment, a first separate distal piece 1000 is changed in shape, creating an inclined position. A second separate distal piece 1100, is partially deflated, creating a declined position. The distal region being in this desired position allows a patient's legs to rest in a bent position. In the illustrated embodiment, the two separate pieces are interconnected. In some embodiments, the two separate pieces are connected by a joint 800.

In some embodiments, the proximate, intermediate, and/or distal regions attach to a surgical bed frame, surgical table, or other surgical support device or system 600. In the illustrated embodiment, the support is attached to a surgical support device with a joint 700. In some embodiments, the support is attached to the railings of a surgical support device or system. In some embodiments, any of the regions of the support attach to the surgical support device or system. An example of such a system is shown in FIG. 8 where the support 10, comprising the proximal region 200, intermediate region 100, and distal region 300 is shown mounted onto a surgical support device or system 600 (e.g., AMSCO 2080M Manual Surgical Table).

The support can be arranged in a first position (e.g., FIG. 1) and then changed in shape into the desired position depicted in FIG. 14. In some embodiments, starting with the support arranged the support in a desired position (e.g., the embodiment depicted in FIG. 14) provides access to specific parts of the body for a procedure, without needing to change the shape of the support. For example, raising the legs in the arched position, with the intermediate region lowered and the proximal region inclined, provides access to a patient's buttocks for a Brazilian Butt Lift procedure. Depending on the part of the body the procedure targets, the support can be arranged to provide access to the specific part of the body.

Figure 15:
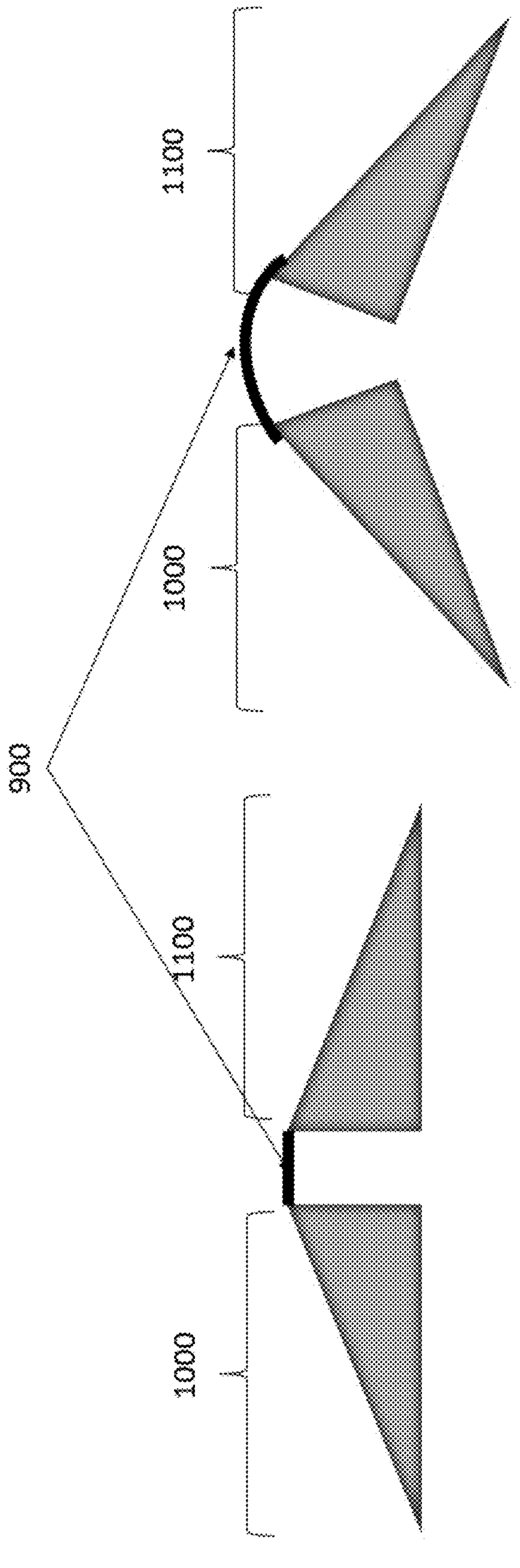
FIG. 15 shows the distal region of the support comprising two separate pieces, with the separate pieces being interconnected.

FIG. 15 depicts the distal region of the support comprising two separate pieces, with the separate pieces being interconnected. In the illustrated embodiment, the distal region is comprised of two separate pieces. In some embodiments, the distal region is comprised of more than two separate pieces. In some embodiments, the distal region is changed in shape to form a desired position.

In the illustrated embodiment, a first separate distal piece 1000 is changed in shape, creating an inclined position. A second separate distal piece 1100, is partially deflated, creating a declined position. In the illustrated embodiment, the two separate pieces are interconnected. In some embodiments, the two separate pieces are connected by a joint 800. In the illustrated embodiment, the two separate pieces are connected by a flex joint 900. The illustrated embodiment depicts the flex joint 900 in a compact position (the left figure) and in a flexed position (the right figure). The flex joint allows the distal region to remain interconnected while the distal region is modified to accommodate the shape of a patient, necessary positions of surgery, storage complications, or other challenge. In some embodiments, the two separate pieces are connected at the bottom. In some embodiments, the two separate pieces are connected at the top. In some embodiments, the two separate pieces are connected in the middle (e.g., along a side) of the pieces. In some embodiments, a point of connection on the first separate distal piece 1000 is the same as the second separate distal piece 1100 (e.g., both pieces connected at the top). In some embodiments, the point of connection on the first separate distal piece 1000 is different as the second separate distal piece 1100.

In some embodiments, any of the regions (i.e., proximal, intermediate, distal, etc.) may comprise a plurality of separate pieces. In some embodiments, any of the separate pieces may be interconnected with a joint, or flex joint, or similar joint.

Figure 16:
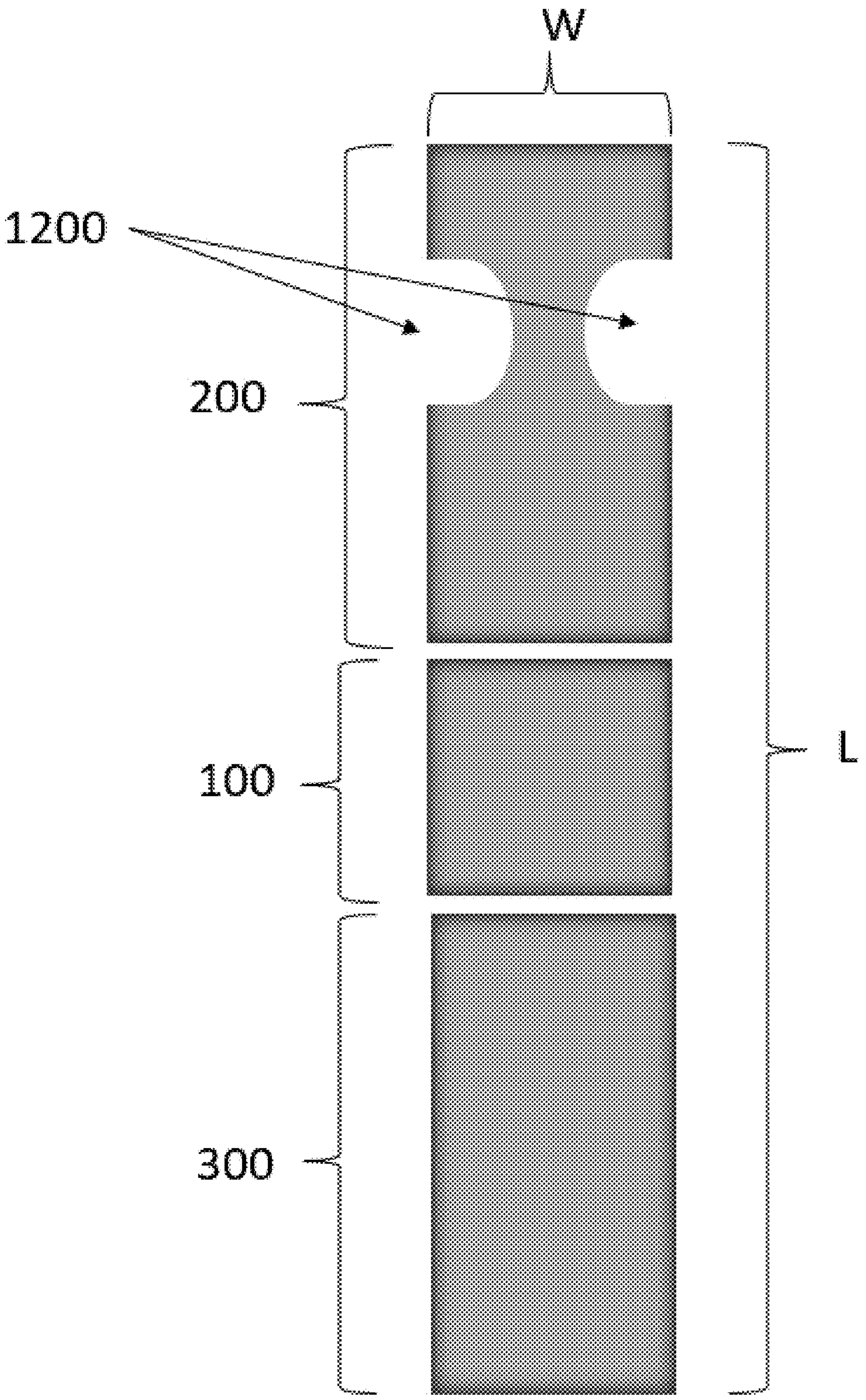
FIG. 16 shows an exemplary support device wherein the patient can lay supine, and the support device has cutouts to allow for access to the breasts.

FIG. 16 depicts an embodiment of such a system viewed from above, wherein the support comprises a proximal region 200, an intermediate region 100, a distal region 300, and cutout segments 1200 in the proximal region 200. The cutout segments may be present in the support at all times or may be generated by removing, deflating, or lowering a sub-portion of the support. In some embodiments, a patient lays supine on the support and a procedure is conducted on the sides of or below the breasts.

Figure 17:
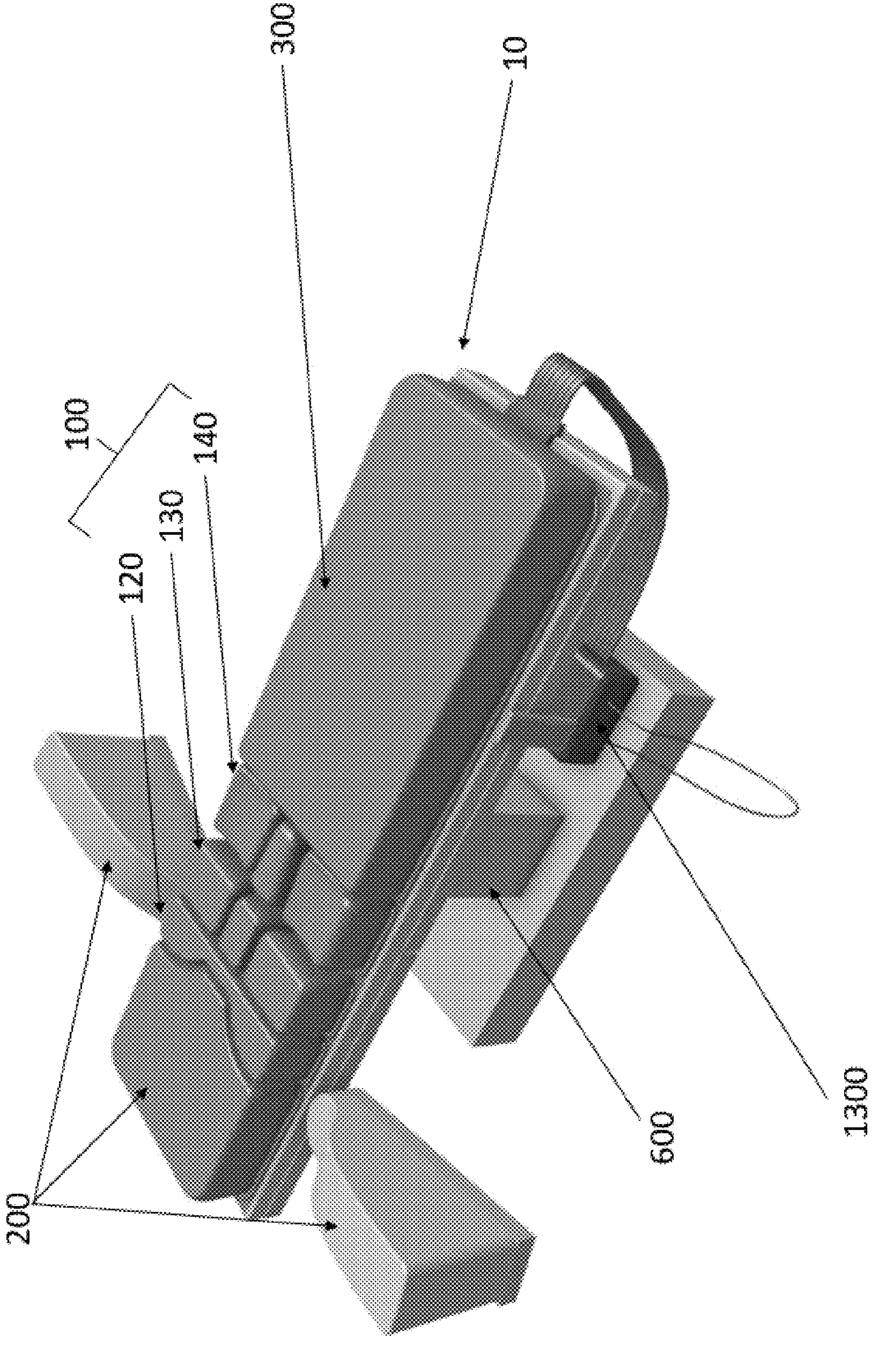
FIG. 17 shows an exemplary support device wherein the patient can lay supine, and the intermediate region of the support device is further segmented into an upper back region, a lower back region and a buttocks region. The support device also comprises arm supports (in the proximal region) and a control system.

FIG. 17 depicts an embodiment of the support device 10, wherein the support 10 comprises a proximal region 200 with arm supports, an intermediate region 100, a distal region 300, and control system 1300 connected near the distal region 300 (control systems may be connected to or positioned in any suitable location). In the illustrated embodiment, the intermediate region 100 is further segmented into three regions, an upper back region 120, a lower back region 130 and a buttocks region 140. In some embodiments, the upper and lower back region collectively are referred to as the torso region. The control system may be present in the support or attached to the support. In some embodiments, the control system provides automated control of the system during a medical procedure. In some embodiments, the control system is manual device or provide some manual and some automated features. In some embodiments, the control system inflates and/or deflates the proximal, intermediate, distal regions, and/or arm supports. In some embodiments, a patient lays supine on the support and a control system is used to inflate and/or deflate the support an needed to access particular body regions of the patient during a medical procedure and/or to provide sufficient support prior to, during, or following a procedure (e.g., during recovery from a procedure).

Figure 18:
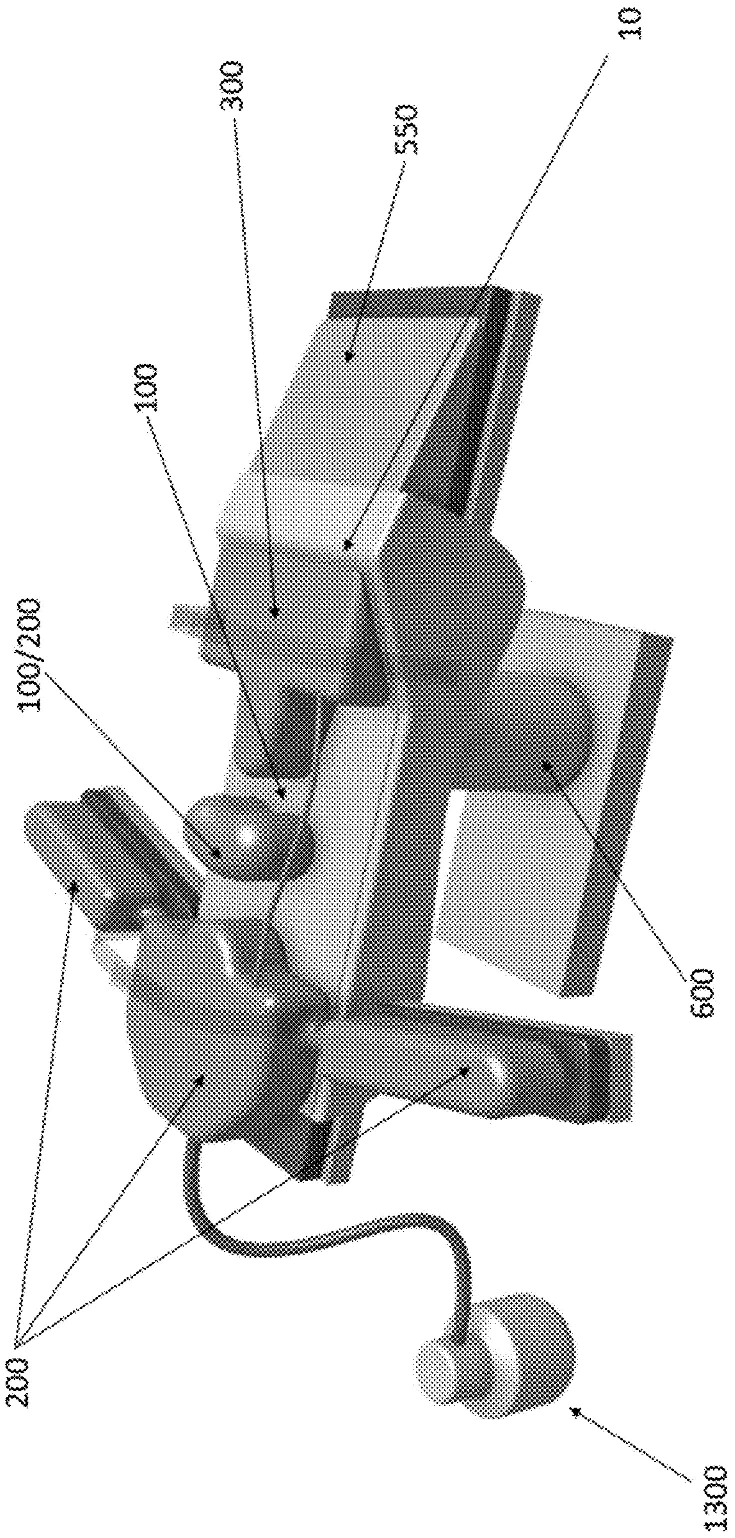
FIG. 18 shows an exemplary support device that has arm supports, a wedge cushion support (an individual block unit), inflatable support regions, and a control system wherein the control system comprises an inflation device.

FIG. 18 depicts an embodiment of a support device 10 wherein the support comprises a proximal region 200 with arm supports, an intermediate/proximal region 100/200, an intermediate region 100, a distal region 300, a wedge support cushion 550 (which may be considered part of the distal region 300), and a control system 1300 connected to the proximal region 200. In some embodiments, the wedge support is a stand-alone component, while in other embodiments, it is a component part of the distal region. In some embodiments, the wedge support cushion is designed to be reuseable. In some embodiments, the intermediate/proximal region 100/200 is part of the proximal region 200 and remains in contact with a patient body throughout a procedure. In other embodiments, the intermediate/proximal region 100/200 is part of the intermediate region 100 and is removed, lowered, or deflated to provide a surgical space below the patient.

Figure 19:
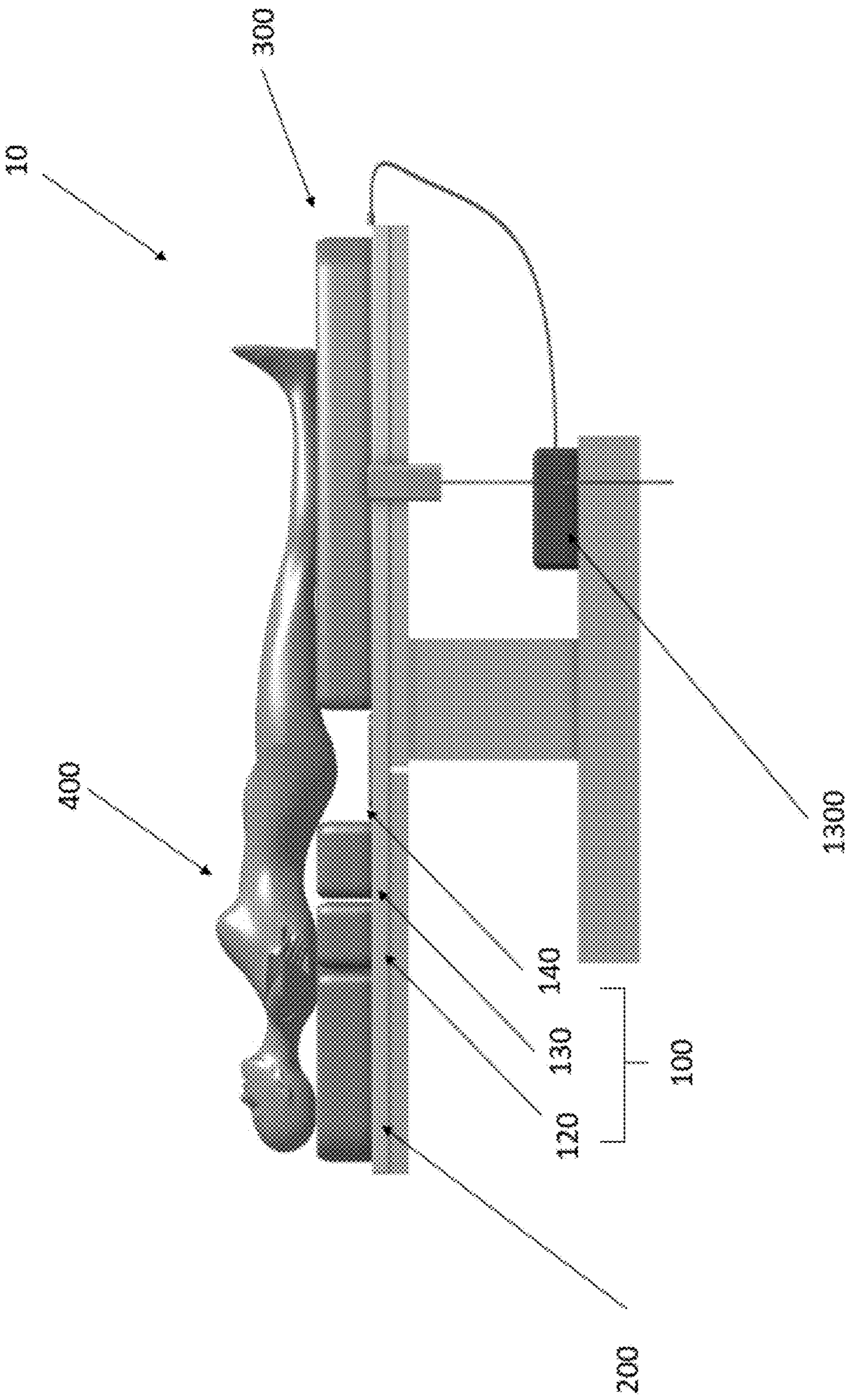
FIG. 19 shows an exemplary support device where the proximal and distal regions are inflated, and the buttocks region of the intermediate region is deflated providing a desired surgical space under the buttocks.

FIG. 19 depicts an embodiment of a support device 10 where the proximal region 200 and distal region 300 are inflated, and the buttocks region 140 of the intermediate region 100 is deflated for a desired position on a surgical support device or system wherein the patient 400 is laying supine, and the support device has arm supports 200 and a control system 1300. In some embodiments, a patient lays supine on the support and a surgical procedure is conducted on the sides of or below the buttocks.

Figure 20:
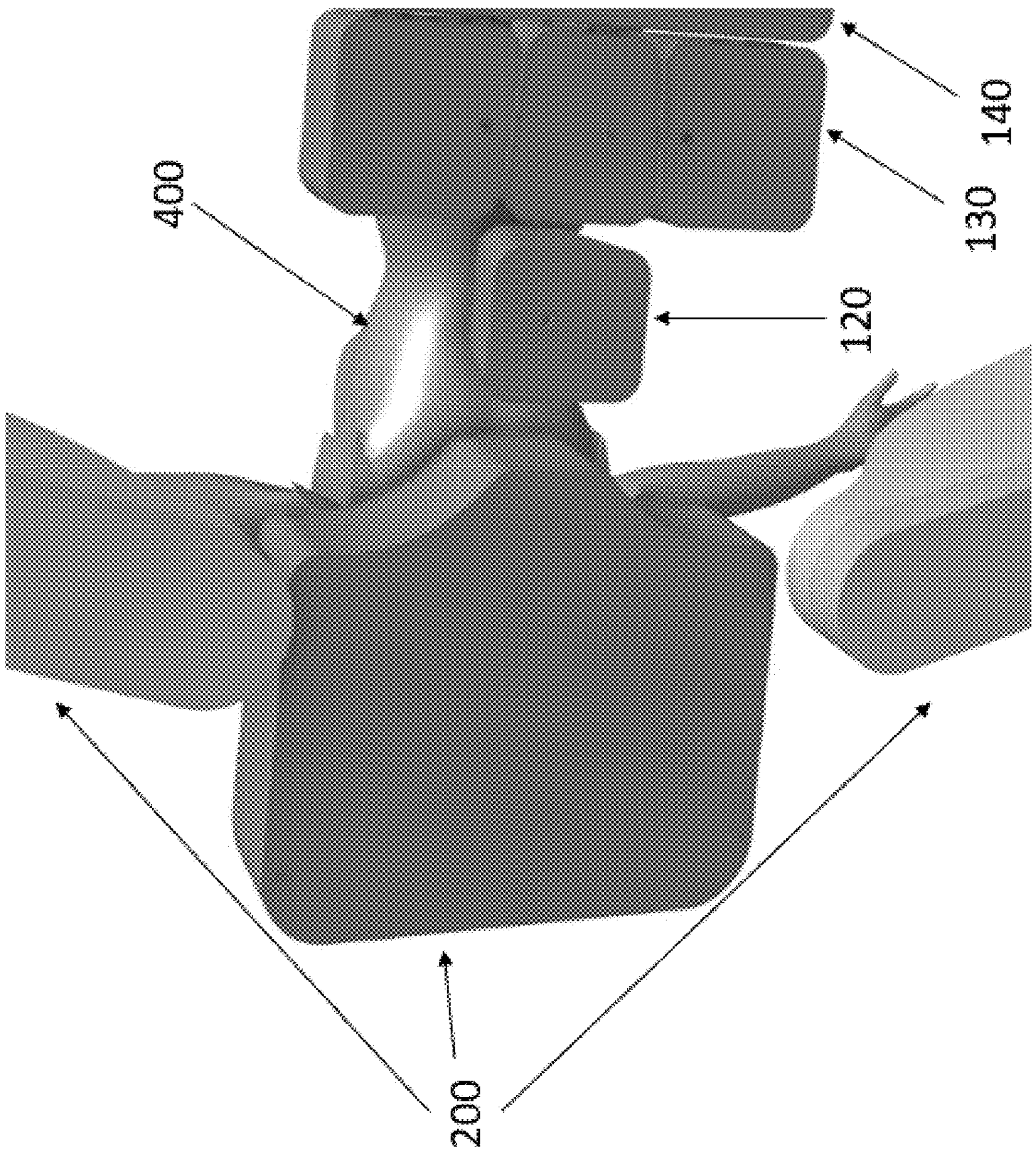
FIG. 20 shows a view underneath the exemplary support device wherein the patient is laying supine, and the intermediate region of the support device is further segmented into an upper back region, a lower back region and a buttocks region.

FIG. 20 depicts an embodiment of a view underneath the support device 10 wherein the patient 400 is laying supine, and the intermediate region 100 of the support device is segmented into three regions, the upper back region 120, lower back region 130 and the buttocks region 140, wherein the different subcomponents of the intermediate region 100 can be alternatively removed, lowered, or deflated to provide access to the posterior of the patient. Likewise, the location of such regions and/or the positioning of the patient on the support can be altered to allow for any of a wide variety of medical procedures to be carried out on the patient, including, but are not limited to, breast surgery, upper back surgery, harvesting of the latissimus dorsi flap, an arm lift, arm liposuction, abdominal liposuction, upper back lift, orthopedic procedures, and urologic surgeries.

Figure 21B:
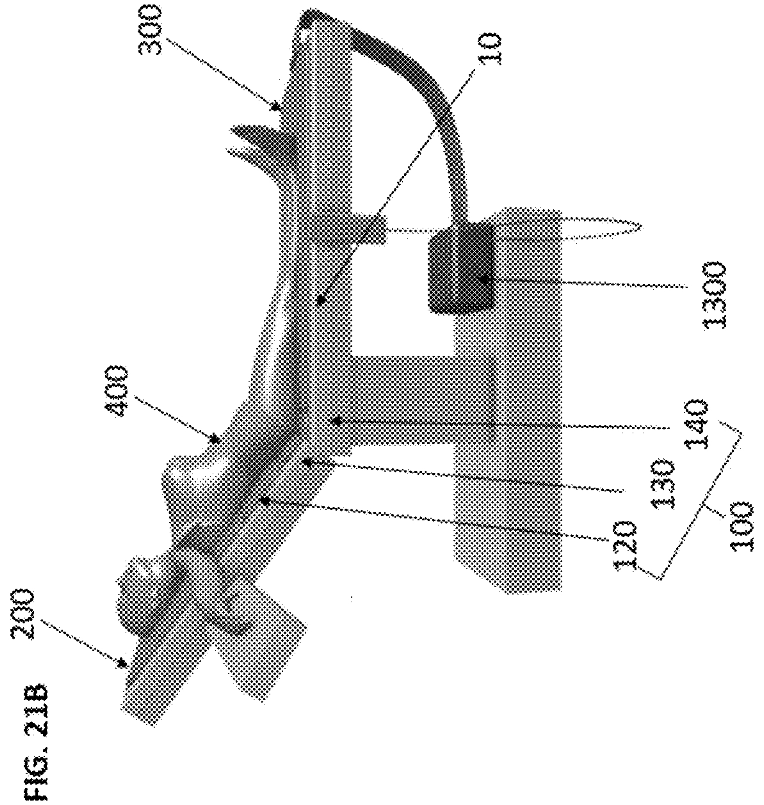
FIG. 21B shows an example of patient positioning on an deflated exemplary support device with an elevated proximal and intermediate region, arm supports and a control system wherein the patient is in a desired position for recovery for a closing incision.
Figure 21A:
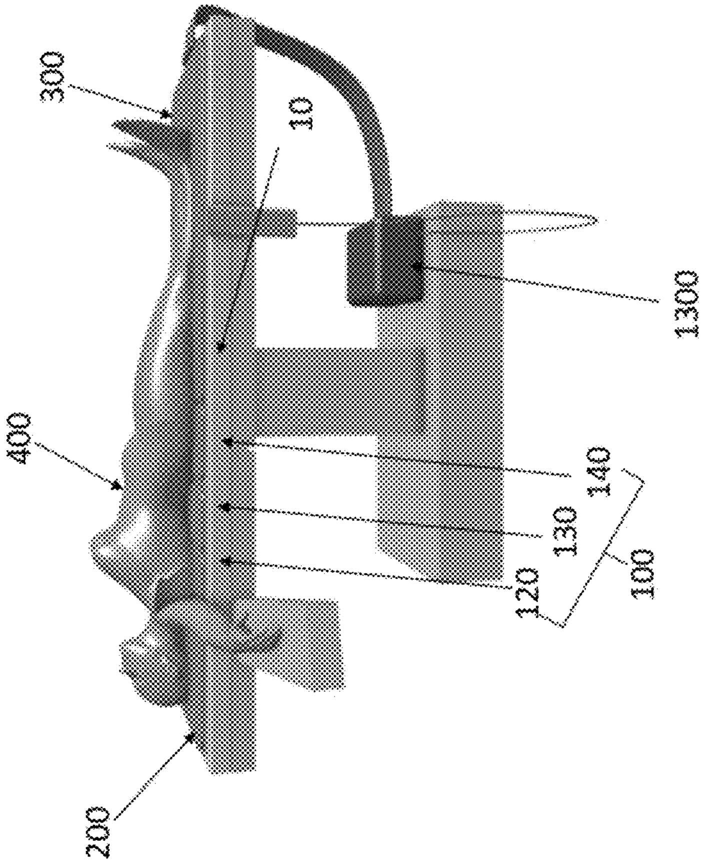
FIG. 21A shows an example of patient positioning on an deflated exemplary support device with arm supports and a control system.

FIG. 21A depicts an embodiment of a patient 400 positioned on a deflated exemplary support device 10 wherein the deflated flat support comprises the proximal region with arm support 200, an intermediate region 100 which is further segmented into three regions, the upper back region 120, lower back region 130 and the buttocks region 140, a distal region 300 and a control system 1300. FIG. 21B depicts an embodiment of a patient 400 positioned on a deflated exemplary support device 10 with an elevated proximal with arm support 200, a partially elevated intermediate region 100 at the upper back region 120 and lower back region 130 as well as and a control system 1300. The buttocks region 140 and distal region 300 are flatly mounted onto a surgical support device or system 600 wherein the patient is in a desired position for recovery for a closing incision. In some embodiments, the control system aids in adjusting the support device during the recovery process of surgical procedures.

Figure 22:
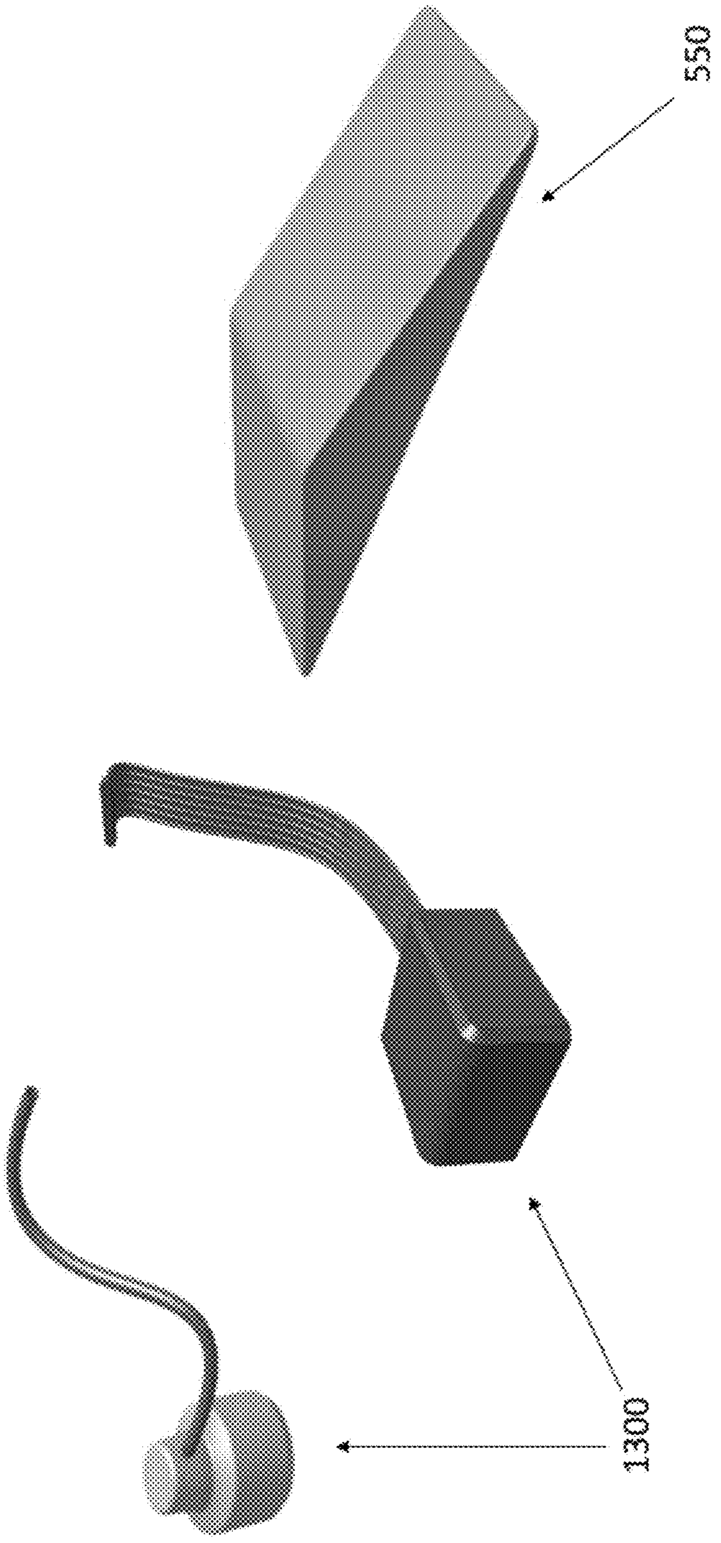
FIG. 22 shows an example of a control system, including an inflation device, and a wedge support cushion used in complement with the exemplary support device.

FIG. 22 depicts an embodiment of control systems 1300 (comprising an inflation device for inflating components of a support system to which it is attached and a command-component that may provide power, electronics for sensors, electronics from communications, and the like) and a wedge support cushion 550 used in complement with an exemplary support device 10 (not shown).

Figure 23:
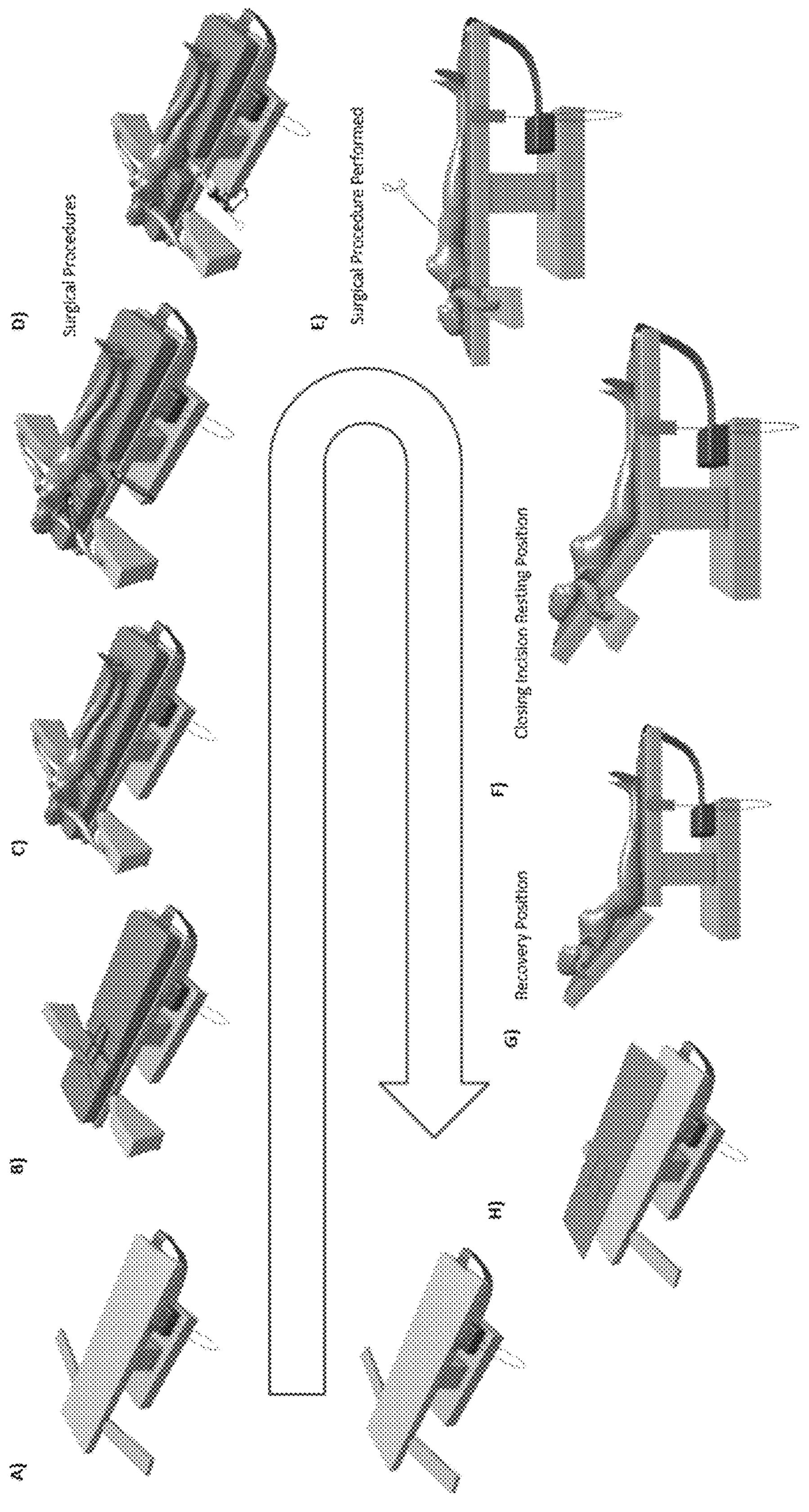
FIG. 23 shows a schematic overview of an illustrative use of the exemplary support device throughout various surgical procedural steps wherein: A) the initial surgical table is without the exemplary support device, B) next the exemplary support device is placed onto the surgical table, C) a patient is placed onto the exemplary support device and the support is inflated leaving a region under the buttocks exposed such that a surgical procedure is performed on a side or under-region of the patient, D) the next image depicts a further step of a surgical procedure, E) all support regions are deflated and a further step of the surgical procedure is performed on a top surface of the patient, F) incisions are closed and the patient is placed in a partially elevated position, G) the patient remains in a partially elevated position for rest and recovery after surgery, and H) following removal of the patient a flat deflated support device is removed, returning the surgical table to its original layout and position.
Figure 24B:
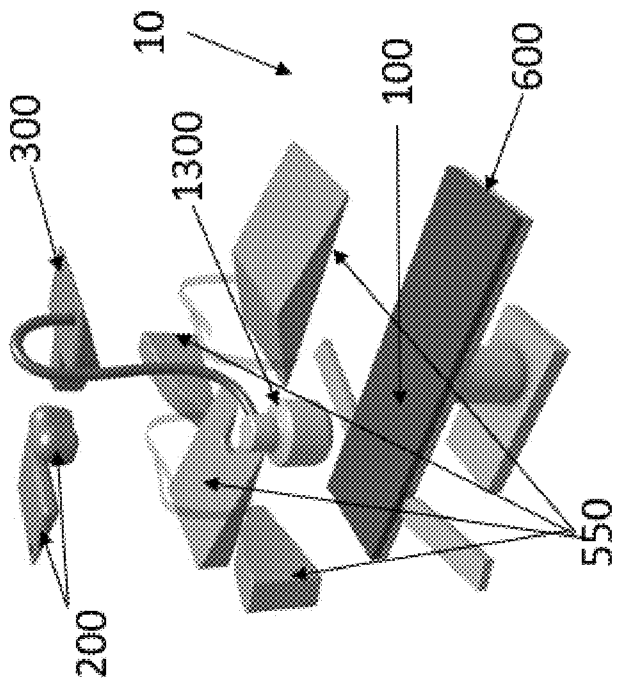
FIGS. 24A-D show A) a fully assembled and inflated support device, B) an exploded view of fully assembled and inflated support device, C) a fully assembled and inflated support device with a patient and D) a fully assembled and deflated support device with a patient and a folded surgical bed.
Figure 24A:
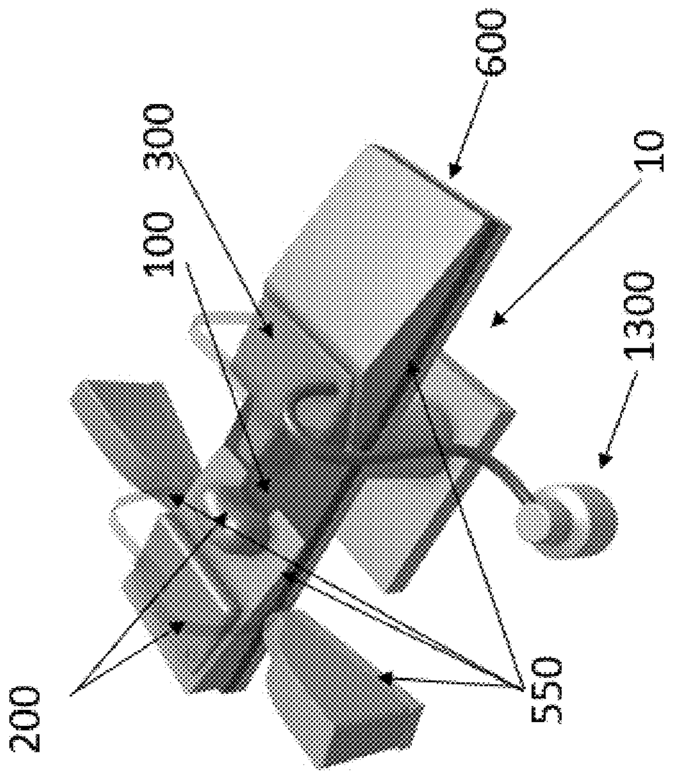
Figure 24D:
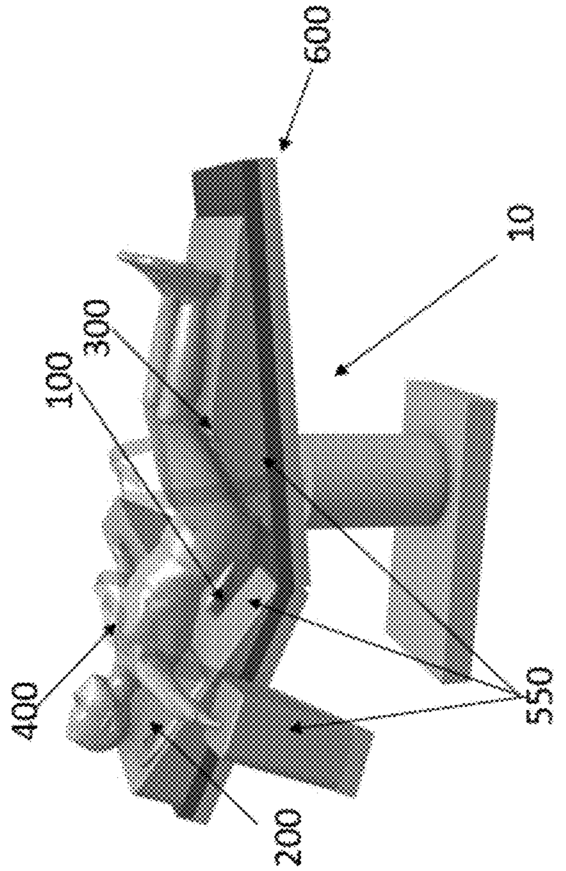
Figure 24C:
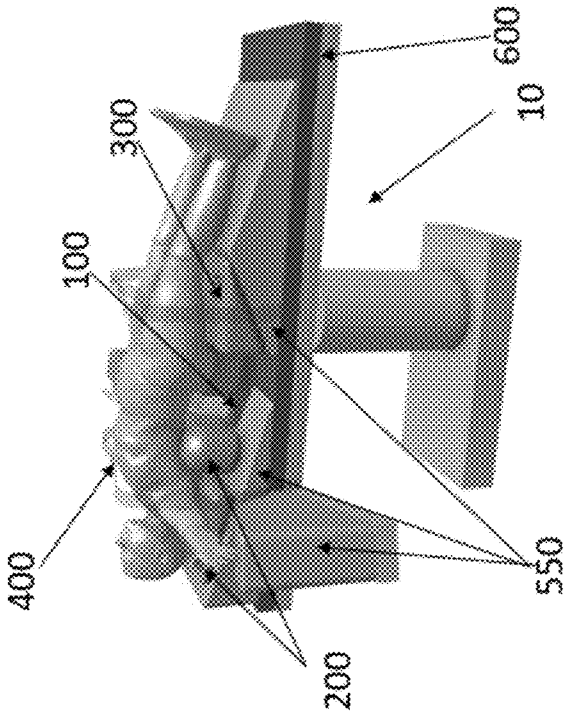

FIG. 23 depicts a schematic overview of an illustrative use of the exemplary support device throughout various surgical procedural steps wherein: A) the initial surgical table layout is without the exemplary support device, B) next the exemplary support device is placed on to the surgical table layout, C) a patient is placed onto the exemplary support device and the support is inflated leaving a region under the buttocks exposed such that a surgical procedure is performed on a side or under region of the patient, D) the next image depicts a further step of a surgical procedure, E) all support regions are deflated and a further step of the surgical procedure is performed on a top surface of the patient, F) incisions are closed and the patient is placed in a partially elevated position, G) the patient remains in a partially elevated position for rest and recovery after surgery, and H) following removal of the patient a flat deflated support device is removed, returning the surgical table to its original layout and position.

FIG. 24 depicts an embodiment of A) a fully assembled and inflated support device 10, B) an exploded view of fully assembled and inflated support device 10, C) a fully assembled and inflated support device 10 with a patient 400 and D) a fully assembled and deflated support device 10 with a patient 400 and a folded surgical support device 600. In some embodiments, the wedge support cushions 550 are positioned on a surgical support device 600, which may optionally have a foam or other cushioned surface. In some embodiments, the wedge support cushion 550 are designed to be reusable. In some embodiments, the wedge support cushions 550 are positioned on the surgical support device 600 in regions to support the patient's head/neck/upper torso region, arm region, mid/lower back region, buttock region and/or leg region. In some embodiments, drapes (not shown) are added over the wedge support cushions 550. In some embodiments, inflatable proximal supports 200 and an inflatable distal support 300 and positioned to create a gap therebetween that provides an intermediate support 100. In some embodiments, the inflatable proximal 200 and distal 300 supports are inflated. In some embodiments, the inflatable proximal 200 and distal 300 supports are designed to be single-use disposable. In some embodiments, the inflated wedge support cushions are inflated before, during and/or after the procedure. In some embodiments, the inflatable proximal 200 and distal 300 are deflated before, during and/or after the procedure. In some embodiments, the patient 400 is positioned on the system and is administered anesthesia. Next, in some embodiments, proximal 200 and distal 300 supports are inflated, and a procedure is performed on the patient's underside. Next, in some embodiments, the surgical support device 600 is folded to optimally position the patient's body to aid in closing the incisions. Next, in some embodiments, the patient is transferred onto a gurney (not shown). In some embodiments, the disposable components are removed and disposed of and the reuseable components are cleaned and disinfected. Optional straps are shown in light gray.

I claim:

1. A patient support device comprising a first region, a second region, and a third region, wherein collectively, the first, second, and third regions provide a surface configured to support a patient; wherein the second region is transitionally inflatable or deflatable independently of the first and third regions to create a space adapted to access to the patient's posterior torso and/or buttocks when said patient is positioned supine on the patient support device and supported by said first and third regions.

2. The support of claim 1, wherein said second region is a lowered position.

3. The support of claim 2, wherein said second region is deflatable and wherein said second region is transitioned to said lowered relative to the first and third regions by deflating said second region.

4. The support of claim 1, wherein the first and third regions is raised.

5. The support of claim 4, wherein the first and third regions is inflatable.

6. The support of claim 1, wherein said first, second, and/or third regions are composed of a plurality of separate support units.

7. The support of claim 6, wherein each of said first, second, and third regions are composed of a plurality of separate support units.

8. The support of claim 7, wherein one or more or each of said first, second, and third regions are composed of a plurality of separate support units are configured to contour to a human body.

9. The support of claim 6, wherein the plurality of separate support units are interconnected to each other.

10. A patient positioning method, comprising:

a) placing a patient, in a supine position, on said patient support of claim 1; and;

b) transitioning said second region of said patient support to generate a space below said patient.

11. The method of claim 10, wherein said patient support is integrated into a surgical patient support device.

12. The method of claim 10, wherein prior to placing said patient, the patient support is placed onto a surgical support device.

13. A system comprising the patient support device of claim 1, mounted on or integrated into a surgical support device, the system further comprising a control system for automated transitioning of said second region from a first position configured to be in contact with said patient to a second position configured to be not in contact with said patient so as to generate said space, wherein the control system comprises a pump that delivers a heated or cooled fluid to or removes a heated or cooled fluid from said patient support device.

14. The method of claim 10, further comprising the step of performing a medical procedure on a posterior side of said patient.

15. The method of claim 14, wherein said medical procedure comprises liposuction.

* * * * *